US008390475B2

(12) United States Patent
Feroldi

(10) Patent No.: US 8,390,475 B2
(45) Date of Patent: Mar. 5, 2013

(54) MOTION CONTROLLED DISPLAY

(75) Inventor: John R. Feroldi, Oakton, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 341 days.

(21) Appl. No.: 12/901,046

(22) Filed: Oct. 8, 2010

(65) Prior Publication Data

US 2011/0018738 A1    Jan. 27, 2011

Related U.S. Application Data

(63) Continuation-in-part of application No. 12/327,916, filed on Dec. 4, 2008, now Pat. No. 8,149,136.

(51) Int. Cl.
*G08G 1/00* (2006.01)
(52) U.S. Cl. ........ 340/901; 340/468; 340/463; 340/464; 340/469; 340/471; 340/472
(58) Field of Classification Search .................. 340/463, 340/464, 469, 471, 472, 901, 905, 906, 907, 340/468
See application file for complete search history.

(56) References Cited

U.S. PATENT DOCUMENTS

| 6,300,870 | B1 * | 10/2001 | Nelson | 340/468 |
|---|---|---|---|---|
| 2008/0183586 | A1 * | 7/2008 | Smith | 705/14 |
| 2008/0278311 | A1 * | 11/2008 | Grange et al. | 340/539.2 |
| 2009/0240394 | A1 * | 9/2009 | He et al. | 701/35 |

* cited by examiner

*Primary Examiner* — Daryl Pope

(57) ABSTRACT

A method comprising creating configured display information; detecting if a display is moving; presenting, via the display, the configured display information if the display is detected to be stationary; identifying, if the display is detected to be moving, whether the configured display information includes moving image display information; presenting, via the display, the configured display information if the display is detected to be moving, and the configured display information does not include moving image display information; identifying, if the display is detected to be moving, the configured display information includes moving image display information, whether the moving image display information includes emergency information or traffic information; presenting, via the display, the configured display information, excluding the moving image display information, if the moving image display information does not include emergency information or traffic information; and presenting, via the display, the configured display information, including the moving image display information, if the moving image display information includes emergency information or traffic.

20 Claims, 17 Drawing Sheets

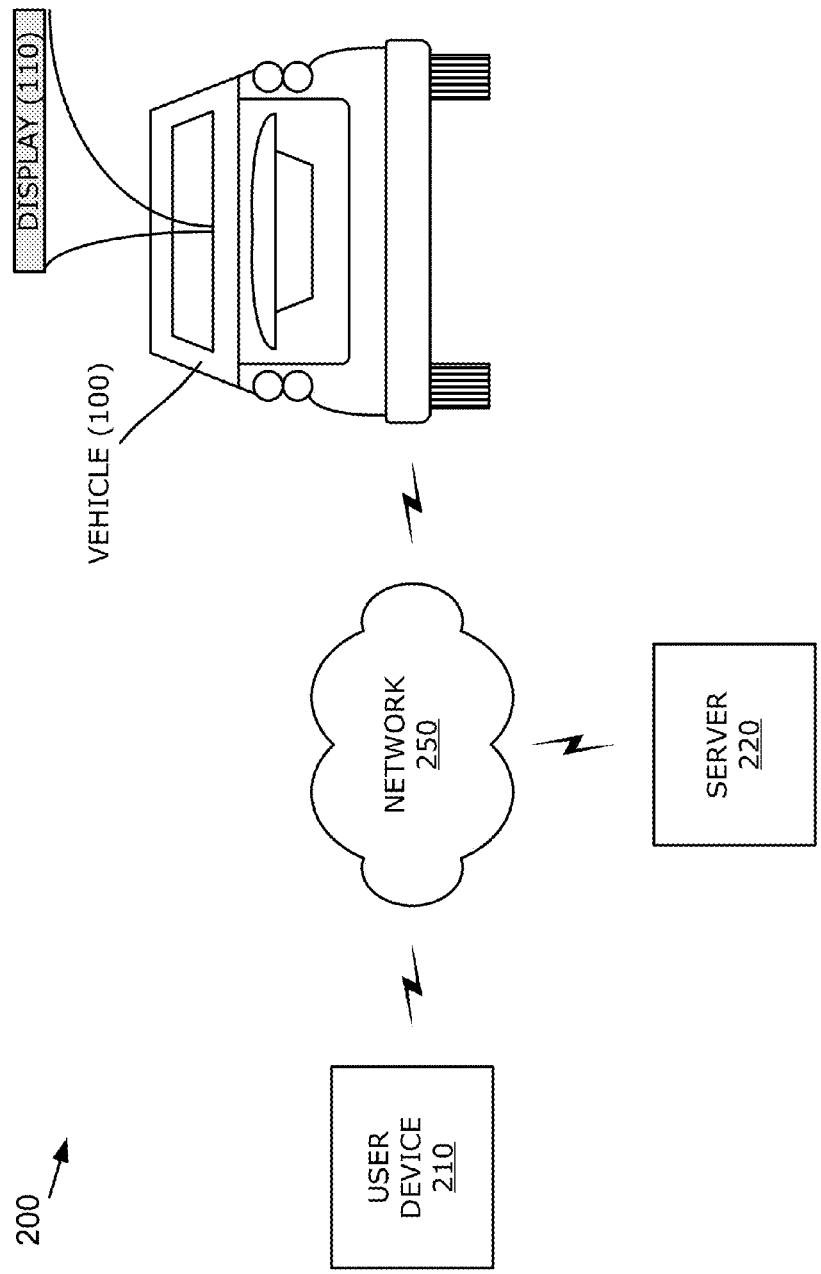

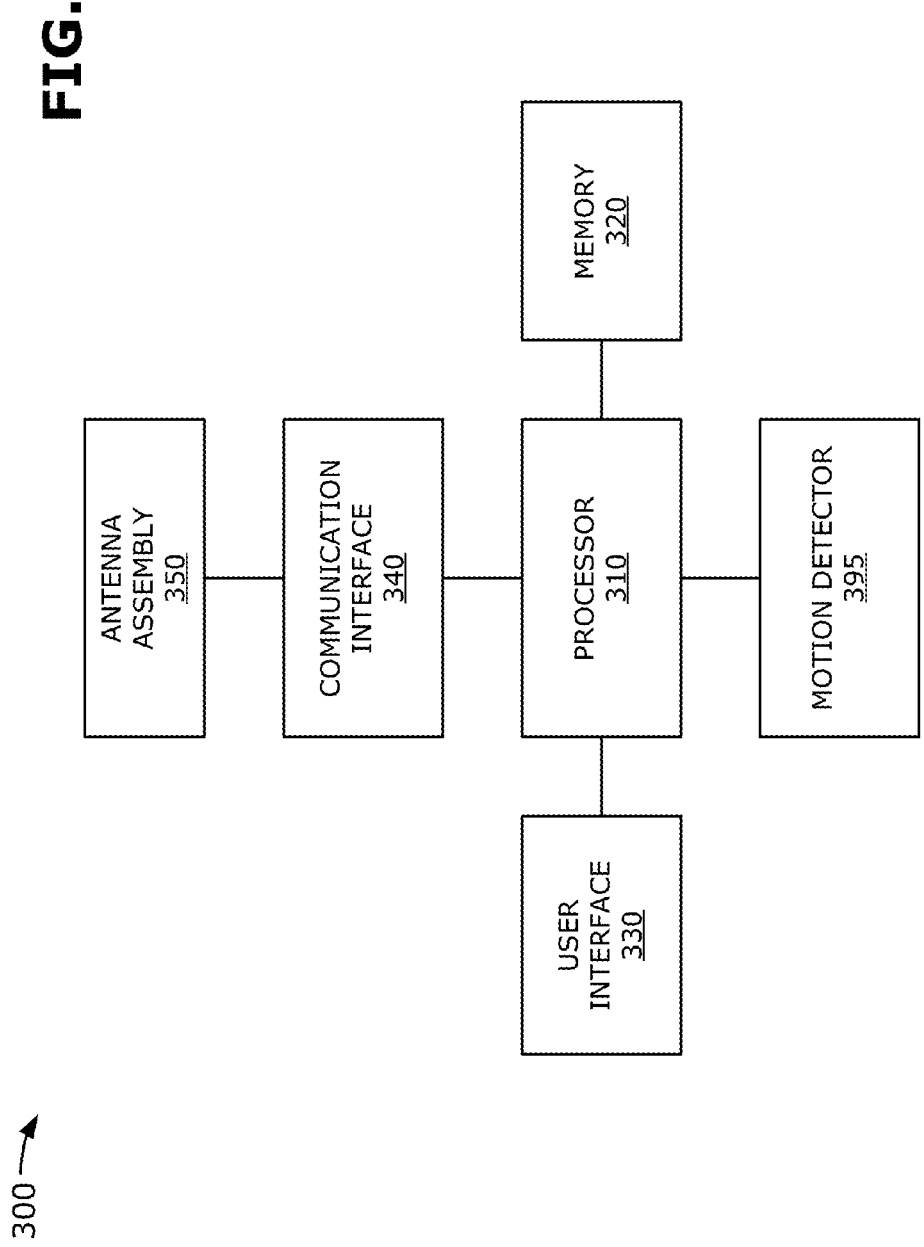

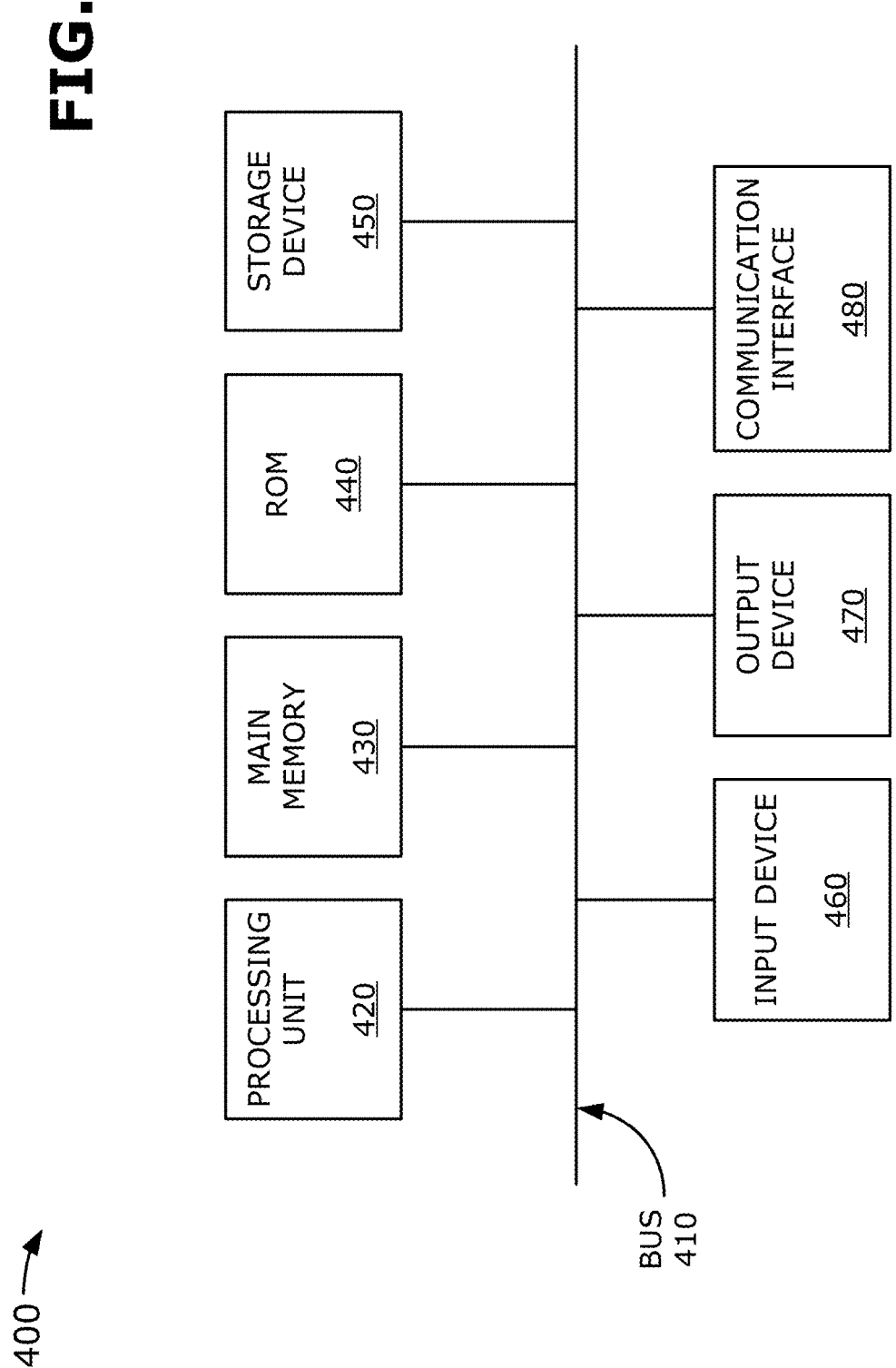

US 8,390,475 B2

MOTION CONTROLLED DISPLAY

RELATED APPLICATION

This application is a continuation-in-part of U.S. patent application Ser. No. 12/327,916, filed Dec. 4, 2008, which is herein incorporated by reference.

BACKGROUND INFORMATION

Electronic displays can be used to provide information to an operator of a vehicle. Such electronic displays can be used to provide an operator of a vehicle with, for example, traffic information, emergency information, or advertisements. However, providing an electronic display that presents a moving image can be distracting for the vehicle operator and thus, put the operator of the vehicle and others at risk of an accident.

BRIEF DESCRIPTION OF THE DRAWINGS

FIG. 2 shows a diagram of an example network in which systems or methods described herein may be implemented.

FIG. 3 shows a diagram of example components of a user device or an electronic display in the network shown in FIG. 2.

FIG. 4 shows a diagram of example components of a server in the network illustrated in FIG. 2.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Figure 1A:
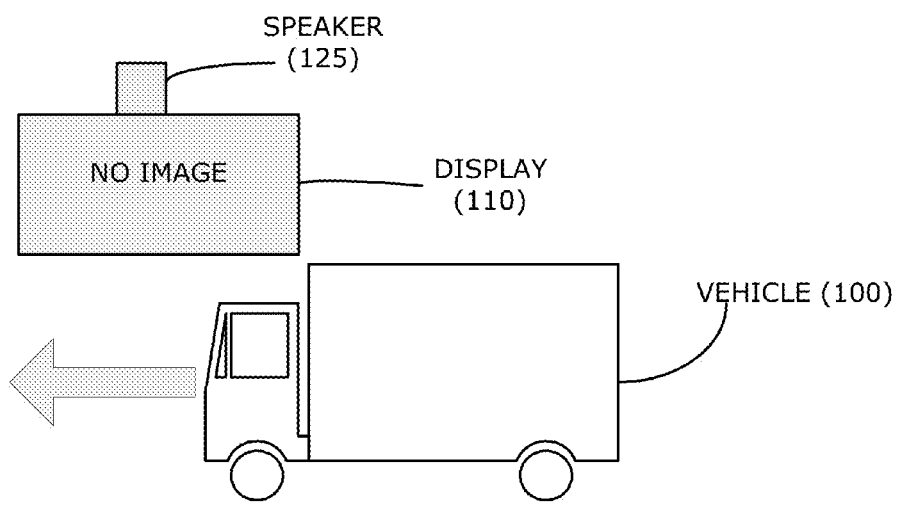
FIGS. 1A and 1B show diagrams of views of example components for an electronic display.
Figure 1B:
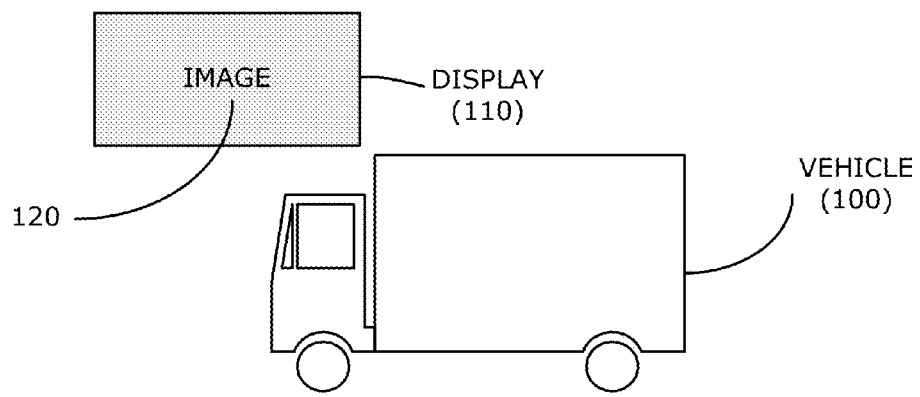

FIGS. 1A and 1B show diagrams of views of example components for an electronic display 110. As shown in FIG. 1A, when a vehicle 100 is in motion (as indicated by the arrow), an electronic display 110 that is associated with vehicle 100 may not display an image. As further shown in FIG. 1B, when vehicle 110 is not in motion (as indicated by the lack of an arrow), an image 120 may be presented on electronic display 110.

Figure 1C:
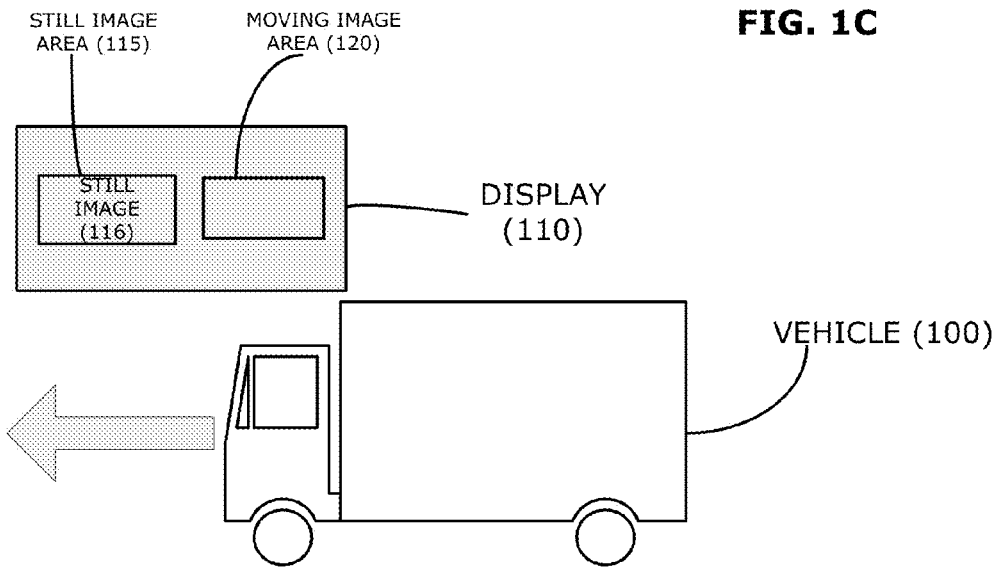
FIGS. 1C and 1D show a diagrams of views of example components for an electronic display.
Figure 1D:
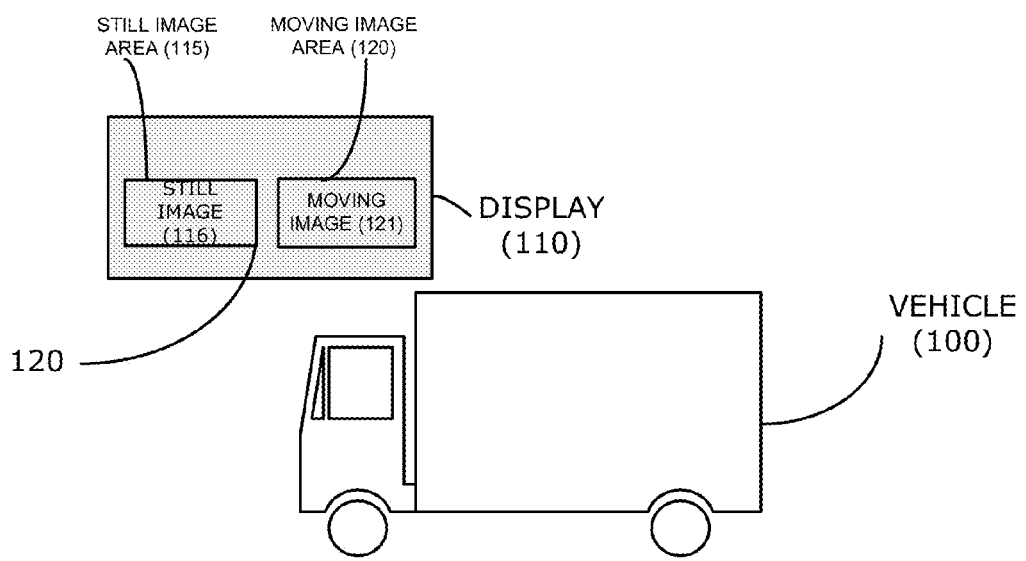

FIGS. 1C and 1D show a diagrams of views of example components for an electronic display 110. As shown in FIG. 1C, the electronic display 110 includes, for example, a still image area 115 that may display a still image 116 and a moving image area 120 that may display a moving image. As further shown in FIG. 1C, when vehicle 100 is in motion (as indicated by the arrow), still image area 116 may display still image 116, while moving image area 120 may not display a moving image. As shown in FIG. 1D, when vehicle 110 is not in motion (as indicated by the lack of an arrow), still image area 116 may display still image 116 and moving image area 120 may display a moving image 121.

As discussed above, the electronic display 110 may include a still image area 116, for displaying a still image and moving image area 120, for displaying a moving image. A still image or moving image may include for example, textual information, graphical information, or video information. The textual information may include multilingual characters, numbers, punctuation symbols, etc. The graphical information may include pictures, symbols, photographs, drawings, graphs, diagrams, geometric designs, maps, other images, etc. The video information may include videos provided in digital formats (e.g., Motion Picture Editors Guild (MPEG-4) format), analog formats, etc.

A speaker 125 (FIG. 1A) may provide audio information that may include audible information, such as audio associated with the video information, warnings, alerts, alarms, etc. Speaker 125 may be located on or in proximity to any portion of the electronic display 110, may receive electrical signals, and may output audio signals based on the received electrical signals. Alternatively, speaker 125 may be located remote from the display and may communicate with the display via any known manner, such as radio, WiFi, Bluetooth, infrared, WiMax, etc.

FIG. 2 is a diagram of an example network 200 in which systems or methods described herein may be implemented. As illustrated, the network 200 may include a user device 210, a server 220, or an electronic display 110 interconnected by a network 250. Components of the network 200 may interconnect via wired or wireless connections. A single user device 210, server 220, electronic display 110, vehicle 100, and network 250 have been illustrated in FIG. 2 for simplicity. In practice, there may be more user devices 210, servers 220, electronic displays 110, vehicles 100, or networks 250. Also, in some instances, one or more components of network 200 may perform one or more functions described as being performed by another one or more components of network 200.

Vehicle 100 may include a mechanism for transporting people or things. For example, vehicle 100 may include an automobile, a van, a truck, a motorcycle, a bicycle, etc.

Electronic display 110 may include a device that may be affixed to vehicle 100 (e.g., to an interior portion or an exterior portion of vehicle 100). Alternatively, electronic display 110 may be affixed to a structure external to and separate from vehicle 100 (e.g., to a roadside billboard or a bumper or side of another vehicle). Electronic display 110 may include an electronic or electro-mechanical display that may display information (e.g., textual information, graphical information, video information) or generate audio information. In one implementation, electronic display 110 may be remotely configured via user device 210 or server 220. Further details of electronic display 110 are provided below in connection with, for example, FIGS. 5-13.

User device 210 may include any device that is capable of accessing server 220 or electronic display 110 via network 250. For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, or other types of computation or communication devices. In one implementation, user device 210 may enable a user to configure information presented by electronic display 110, in a manner described herein. For example, user device 210 may create a display to be presented by electronic display 110 (e.g., either directly via user device 110 or via interaction with server 220), may select a display to be presented by electronic display 110 (e.g., via interaction with server 220), and may provide the created or selected display to electronic display 110. Electronic display 110 may receive the created/selected display from user device 210 (or from server 120), and may display the created/selected display.

Server 220 may include a computation or communication devices that gathers, processes, searches, or provides information in a manner described herein. Server 220 may receive display information or display configuration inputs for electronic display 110, from user device 210, and may receive advertisement information for electronic display 110 (e.g., from one or more providers of a product or service). Server 220 may receive pre-created displays (e.g., that may be presented by the electronic display 110) from a producer of displays (e.g., similar to a producer of bumper stickers), and may receive displays created by friends of the user associated with the electronic display 110. Server 220 may also receive emergency information (e.g., evacuation information) from state or federal agencies (e.g., in the event of a state or national emergency) or from a manufacturer of vehicle 100. Server 220 may store such information in a repository (e.g., a memory) associated with server 220, and may utilize such information to create configured display information that may be presented by electronic display 110.

In another implementation, if server 220 is associated with a product or service provider, server 220 may receive (e.g., from a user) display configuration inputs or display information for multiple electronic displays 110 affixed to multiple vehicles 100. For example, the user may provide display configuration inputs for a current promotion being offered by the product or service provider. Server 220 may create configured display information (e.g., information for displaying a display providing the current promotion offered by the product or service provider), and may provide configured display information to multiple electronic displays 110 affixed to multiple vehicles 100. Such an arrangement may enable the product or service provider to display the same promotion on vehicles 100 owned (or associated with) the provider. Server 220 may also customize configured electronic display information based on geography, time, etc. In such a scenario, server 220 may provide certain customized display information to certain electronic displays 110 (e.g., the electronic display 110 affixed to vehicles 100 in a certain geographical area or at a certain time of day), and may provide other customized display information to other electronic displays 110 (e.g., the electronic displays 110 affixed to vehicles 100 in another geographical area or at another time of day).

In still other implementations, user device 210 or server 220 may create display information (e.g., for display by the electronic display 110) that includes advertisements (e.g., satellite radio subscribers may be paid to display advertisements on electronic display 110), event or location information (e.g., groups traveling in multiple vehicles to events may provide, via electronic display 110, event information or global positioning system (GPS) information), authorization information (e.g., the electronic display 110 may display a parking fee payment, a high-occupancy vehicle (HOV) permit, etc.), other information (e.g., a current radio station or song being played by a radio associated with vehicle 100), etc.

Network 250 may include a local area network (LAN), a wide area network (WAN), a metropolitan area network (MAN), a telephone network, such as the Public Switched Telephone Network (PSTN), the Public Land Mobile Network (PLMN), or a cellular telephone network, an intranet, the Internet, a satellite network, or a combination of networks.

FIG. 3 illustrates a diagram of example components of a device 300 that may correspond to electronic display 110. As illustrated, device 300 may include a processor 310, memory 320, a user interface 330, a communication interface 340, an antenna assembly 350, and a motion detector 395.

Processor 310 may include one or more microprocessors, application-specific integrated circuits (ASICs), field-programmable gate arrays (FPGAs), or the like. In one implementation, processor 310 may control operation of components of the device 300 in a manner described herein.

Memory 320 may include a random access memory (RAM), a read-only memory (ROM), or another type of memory to store data and instructions that may be used by processor 310.

User interface 330 may include mechanisms for inputting information to device 300 or for outputting information from device 300. Examples of input and output mechanisms might include buttons (e.g., control buttons, keys of a keypad or keyboard, a joystick, etc.) or a touch screen interface (e.g., a display) to permit data and control commands to be input into device 300; a speaker to receive electrical signals and output audio signals; a microphone to receive audio signals and output electrical signals; a display to output visual information (e.g., text input into device 300, etc.

Communication interface 340 may include, for example, a transmitter that may convert baseband signals from processor 310 to radio frequency (RF) signals or a receiver that may convert RF signals to baseband signals. Alternatively, communication interface 340 may include a transceiver to perform functions of both a transmitter and a receiver. Communication interface 340 may connect to an antenna assembly 350 for transmission or reception of the RF signals.

Antenna assembly 350 may include one or more antennas to transmit or receive RF signals over the air. Antenna assembly 350 may, for example, receive RF signals from the communication interface 340 and transmit them over the air, and receive RF signals over the air and provide them to communication interface 340. In one implementation, for example, communication interface 340 may communicate with a network or devices connected to a network.

Motion detector 395 may include a mechanism or sensing device for detecting the motion of vehicle 100. Examples of a motion detector may include a global positioning system (GPS) (either as part of vehicle 100 or separate from vehicle 100 (e.g., a mobile communication device, such as a cell phone or a personal digital assistance (PDA))) or a speedometer of vehicle 100. Motion detector 395 may be connected, for example, to processor 310. Motion detector 395 may provide signals to processor 310, where processor 310, for example, may control electronic display 110 based on the detected motion of vehicle 100, as will be described below.

As will be described in detail below, device 300 may perform certain operations, described herein, in response to processor 310 executing software instructions of an application contained in a computer-readable medium, such as memory 330. A computer-readable medium may be defined as a physical or logical memory device. A logical memory device may include memory space within a single physical memory device or spread across multiple physical memory devices. Software instructions may be read into memory 330 from another computer-readable medium or from another device via communication interface 340. Software instructions contained in memory 330 may cause processor 310 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may contain fewer, different, differently arranged, or additional components than depicted in FIG. 3. In still other implementations, one or more components of device 300 may perform one or more other tasks described as being performed by one or more other components of device 300.

FIG. 4 is an example diagram of a device 400 that may correspond to user device 210 or server 220. As illustrated, device 400 may include a bus 410, a processing unit 420, a main memory 430, a ROM 440, a storage device 450, an input device 460, an output device 470, or a communication interface 480. Bus 410 may include a path that permits communication among the components of device 400.

The processing unit 420 may include one or more processors, microprocessors, or other types of processing units that may interpret and execute instructions. Main memory 430 may include a RAM or another type of dynamic storage device that may store information and instructions for execution by processing unit 420. ROM 440 may include a ROM device or another type of static storage device that may store static information or instructions for use by processing unit 420. Storage device 450 may include a magnetic or optical recording medium and its corresponding drive, or a removable memory, such as a flash memory.

Input device 460 may include a mechanism that permits an operator to input information to device 400, such as a keyboard, a mouse, a pen, a microphone, voice recognition or biometric mechanisms, a remote control, a touch screen, etc.

Output device 470 may include a mechanism that outputs information to the operator, including a display, a printer, a speaker, etc.

Communication interface 480 may include any transceiver-like mechanism that enables the device 400 to communicate with other devices or systems. For example, communication interface 480 may include mechanisms for communicating with another device or system via a network, such as network 250.

As described herein, device 400 may perform certain operations in response to processing unit 420 executing software instructions contained in a computer-readable medium, such as main memory 430. Software instructions may be read into main memory 430 from another computer-readable medium, such as storage device 450, or from another device via communication interface 480. The software instructions contained in main memory 430 may cause processing unit 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows example components of device 400, in other implementations, device 400 may contain fewer, different, differently arranged, or additional components than depicted in FIG. 4. In still other implementations, one or more components of device 400 may perform one or more other tasks described as being performed by one or more other components of device 400.

Figure 5:
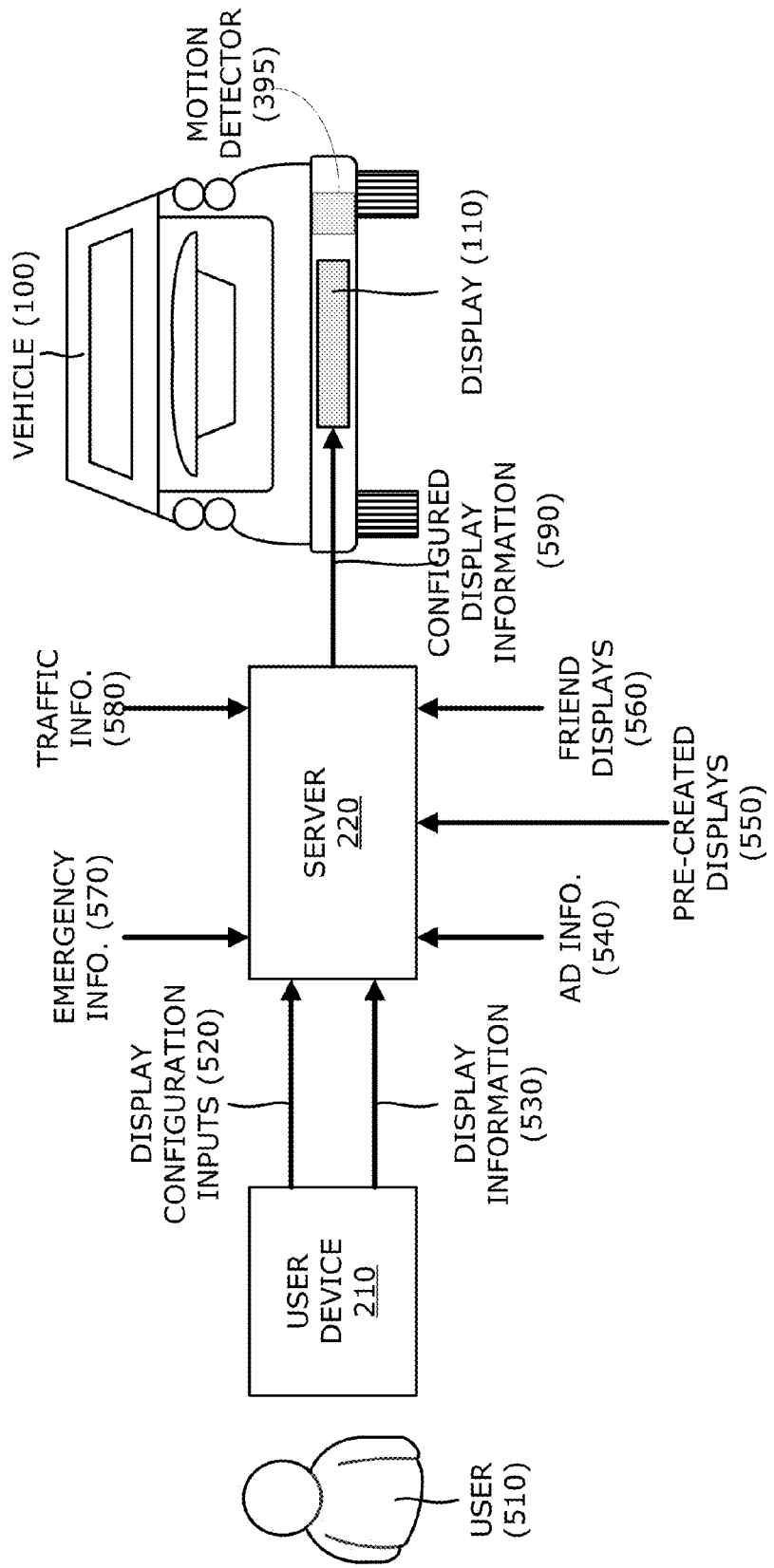
FIG. 5 shows a diagram of an electronic display configuration capable of being provided by an example portion of the network illustrated in FIG. 2.

FIG. 5 shows a diagram of example display configuration operations capable of being performed by an example portion 500 of network 200. As illustrated, example network portion 500 may include a user device 210, a server 220, an electronic display 110, and a vehicle 100. User device 210, server 220, electronic display 110, and vehicle 100 may include the features described above in connection with, for example, FIGS. 1A-1D and 2-4.

As further shown in FIG. 5, a user 510 may be associated with user device 210. In one implementation, user 510 may include an owner of user device 210, electronic display 110, or vehicle 100. In other implementations, user 510 may be associated with user device 210, electronic display 110, or vehicle 100, but may not be the owner of user device 210, electronic display 110, or vehicle 100. For example, user 510 may be associated with a service (e.g., provided by server 220) that enables user 510 to create or select displays to be presented by electronic display 110. User 510 may access (e.g., via user device 210) the service (e.g., via a password or account information) provided by server 220, and may provide display configuration inputs 520 or display information 530 to server 220. Display configuration inputs 520 may include a user 510 selection of a display (e.g., a display stored in a memory associated with server 220), a user 510 creation of a custom display (e.g., rather than selecting a display), etc. As discussed above, with respect to FIGS. 1A-1D, display information 530 may include still image information or moving image information including, textual information, graphical information, video information, etc. to be included in the selected/created display. Display information 530 may also include generated audio information associated with still image information or moving image information.

Server 220 may receive a variety of information from other sources, as shown in FIG. 5. For example, server 220 may receive advertisement (ad) information 540, for electronic display 110, from one or more providers of a product or service. Advertisement information 540 may include one or more advertisements associated with products or services provided by the product or service provider. Server 220 may receive pre-created displays 550 from a producer of displays (e.g., similar to a producer of bumper stickers). Pre-created displays 550 may include displays that may be presented by electronic display 110. In another implementation, an owner or manager of server 220 may create pre-created displays 550. Server 220 may receive friend displays 560 from friends of user 510. Friend displays 560 may include displays, created by the user's 510 friends, which may be presented by electronic display 110. User 510 may permit his/her friends to utilize displays created or owned by user 510. Likewise, user's 510 friends may permit user 510 to utilize displays created or owned by user's 510 friends. Such an arrangement may create a social network for electronic display 110, where owners of electronic display 110 may share displays on electronic display 110.

As further shown in FIG. 5, server 220 may receive emergency information 570 from state or federal agencies (e.g., in the event of a state or national emergency) or from a manufacturer of vehicle 100. Emergency information 570 may include, for example, information advising travelers of emergencies (e.g., hurricanes, tornados, flooding, etc.), information providing emergency instructions (e.g., evacuation information), etc., which may be received from state or federal agencies. Emergency information 570 may also include warnings associated with operation of vehicle 100 or vehicle passengers (e.g., excessive internal vehicle temperature warnings, excessive internal vehicle carbon dioxide or carbon monoxide warnings, etc.), which may be received from a manufacturer of vehicle 100. Server 220 may receive traffic information 580 from state or local agencies (e.g., in the event of traffic problems). The traffic information 580 may include traffic accident information, traffic congestion information, lane closing information, road construction information, etc. Server 220 may store the display information 530 or the information received from the other sources in a repository (e.g., the main memory 430, the ROM 440, or the storage device 450) associated with server 220, and may utilize such information to create configured display information 590 that may be presented by electronic display 110.

Configured display information 590 may include information capable of being presented by electronic display 110. For example, in one implementation, configured display information 590 may include textual information, graphical information, video information, or audio information, as described above in connection with, for example, FIGS. 1A-1D. In other implementations, configured display information 590 may include one or more of display information 530, advertisement information 540, pre-created displays 550, friend displays 560, emergency information 570, or traffic information 580. Server 220 may provide configured display information 590 to electronic display 110, and electronic display 110 may receive and provide configured display information 590 (e.g., via electronic display 110 or the speaker 125).

In one example implementation, electronic display 110 may receive configured display information 590, and may configure text, graphics, or video based on configured display information 590. In one example, electronic display 110 may extract textual, graphical, or video information from configured display information 590, may convert the textual, graphical, or video information to formats capable of being presented by electronic display 110, and may provide the converted textual, graphical, or video information to electronic display 110. Electronic display 110 may display configured text, graphics, or video, as a still image, a moving image, or a combination thereof. Electronic display 110 may also configure audio (e.g., associated with speaker 125) based on configured display information 590. In one example, electronic display 110 may extract audio information from configured display information 590, may convert audio information to a format capable of being generated by speaker 125, and may provide converted audio information to speaker 125. Electronic display 110 may generate (e.g., via speaker 125) configured audio.

As further shown in FIG. 5, vehicle 100 may include a motion detector 395 for detecting motion of vehicle 100. As described above, in connection with, for example, FIG. 3, motion detector 395 may include a mechanism or sensing device for detecting the motion of vehicle 100. Examples of a motion detector 395 may include a global positioning system (GPS) (either as part of the vehicle or separate from the vehicle (e.g., a mobile communication device, such as a cell phone or a personal digital assistance (PDA))), or a speedometer of vehicle 100. Motion detector 395 may communicate with server 220, for example. Motion detector 395 may provide signals to server 220, where the processor may control the electronic display 110 based on the detected motion of vehicle 100. For example, in one implementation, motion detector 395 may detect that vehicle 100 is moving. Motion detector 395 may send a signal to server 220. In response to the receipt of the signal from motion detector 395, server 220 may prevent electronic display 110 from displaying still image 116 or moving image 121. In an alternative implementation, in response to the receipt of the signal from motion detector 395, server 220 may prevent electronic display 110 from displaying moving image 121, but may allow electronic display 110 to display still image. (As shown, e.g., in FIG. 1C.)

When motion detector 395 detects that the vehicle has stopped or that the vehicles speed has dropped below a particular threshold, motion detector may provide a second signal to server 220, for example. In response to the second signal from motion detector 395, server 220 may allow still image 116 or moving image 121 to be presented on electronic display 110. (As shown, e.g., in FIG. 1D.) In an implementation where motion detector 395 is separate from vehicle 100, motion detector 395 may communicate, for example, with processor 310 via any known manner, such as via radio, WiFi, Bluetooth, infrared, WiMax, etc.

In an alternative implementation, rather than sending signals from motion detector 395 to server 220, a processor 310, associated with electronic display 110, for example, may locally control configured display information 590. For example, in one implementation, electronic display 110 may receive configured display information 590, including moving image information. If motion detector 395 detects that vehicle 100 is moving, a processor 310, associated with electronic display 110, may prevent a moving image 121 from being shown on electronic display 110.

Although FIG. 5 shows example components of network portion 500, in other implementations, network portion 500 may contain fewer, different, differently arranged, or additional components than depicted in FIG. 5. In still other implementations, one or more components of network portion 500 may perform one or more other tasks described as being performed by one or more other components of network portion 500. For example, in one example implementation, server 220 may be omitted and user device 210 may perform the functions described as being performed by server 220.

Figure 6:
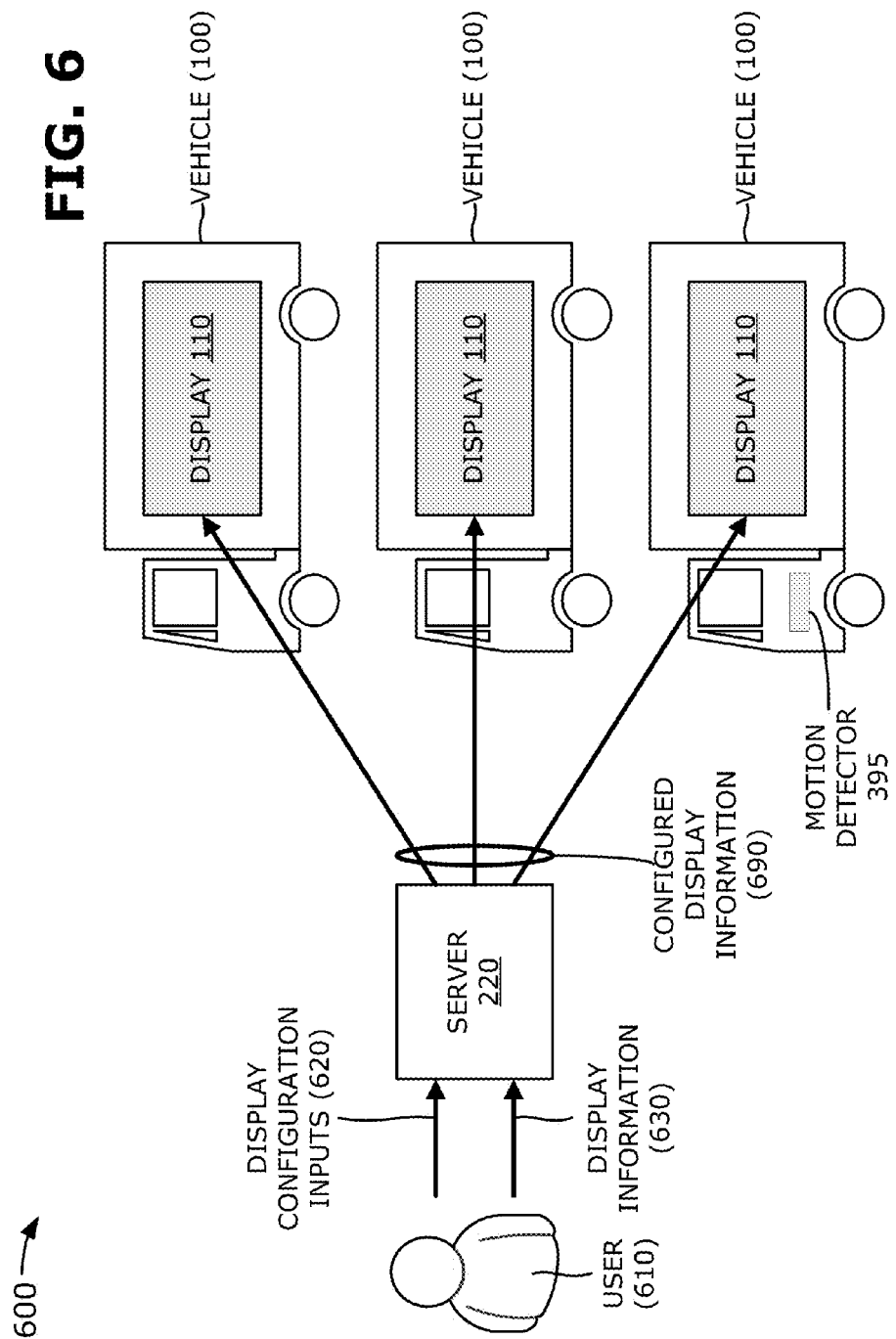
FIG. 6 shows a diagram of an electronic display configuration capable of being provided by an example portion of the network illustrated in FIG. 2.

FIG. 6 depicts a diagram of example display configuration operations capable of being performed by an example portion 600 of network 200. As illustrated, example network portion 600 may include a server 220, multiple electronic displays 110, and multiple vehicles 100. Server 220, electronic displays 110, and vehicles 100 may include the features described above in connection with, for example, FIGS. 1A-4.

As further shown in FIG. 6, a user 610 may be associated with server 220. In one implementation, user 610 may include an employee or an owner of a product or service provider that is associated with (or owns) electronic displays 110 or vehicles 100. For example, user 610 may be associated with a company that owns electronic displays 110 or vehicles 100 and wishes to convey messages associated with the company (e.g., a promotion for a product or service offered by the company). User 610 may access server 220 (e.g., via a password or account information), and may provide display configuration inputs 620 or display information 630 to server 220. The display configuration inputs 620 may include the user's 610 selection of a display (e.g., a display stored in a memory associated with server 220), a user's 610 creation of a custom display (e.g., rather than selecting a display), etc. Display information 630 may include textual information, graphical information, and video information, to be included in the selected/created display. Display information 630 may also include audio information associated with the textual information, graphical information, or video information. For example, in one implementation, user 610 may provide display configuration inputs 620 or display information 630 associated with a current promotion being offered by the product or service provider. Display information 630 may be presented, by electronic display 10, as a still image, a moving image, or a combination thereof.

Server 220 may receive a variety of information from other sources (e.g., as shown in connection with FIG. 5), and may create configured display information 690 based on display configuration inputs 620, display information 630, or the variety of information from other sources. (As discussed above in connection with FIG. 5, for example.) Configured display information 690 may include information capable of being presented by electronic displays 110. For example, in one implementation, configured display information 690 may include textual information, graphical information, video information, or audio information, as described above, in connection with, for example, FIGS. 1A-1D. As also described above, in connection with, for example, FIGS. 1A-1D, the textual information, graphical information, or video information may be provided as a still image 116, a moving image 121, or a combination thereof. In other implementations, configured display information 690 may include display information 630 and may be different for each of electronic displays 110 depicted in FIG. 6. Server 220 may provide configured display information 690 to electronic displays 110 affixed to the multiple vehicles 100 (e.g., cars, trucks, vans, etc. associated with the product or service provider). Each of electronic displays 110 may receive configured display information 690, and may present configured display information 690.

In one example, configured display information 690 may include information for providing a display containing the current promotion offered by the product or service provider. The arrangement depicted in FIG. 6 may enable the product or service provider to display the same promotion on vehicles 100 owned by (or associated with) the provider. In one example implementation, server 220 may customize configured display information 690 based on geographical information, time information, etc. associated with vehicles 100. In such a scenario, server 220 may provide certain customized configured display information 690 to certain electronic displays 110 (e.g., electronic displays 110 affixed to vehicles 100 in a certain geographical area or at a certain time of day), and may provide other customized configured display information 690 to other electronic displays 110 (e.g., electronic displays 110 affixed to vehicles 100 in another geographical area or at another time of day).

In another implementation (e.g., as discussed above in connection with FIG. 5), configured display information 690 may include emergency information 570, or traffic information 580.

As further shown in FIG. 6, vehicles 100 may include motion detectors 695 for detecting motion of vehicles 100. For simplicity, a motion detector 395 is only shown on one of vehicles 100. As described above, in connection with, for example, FIG. 3, motion detector 395 may include a mechanism or sensing device for detecting the motion of vehicle 100. Examples of a motion detector 395 may include a global positioning system (GPS) (either as part of the vehicle or separate from the vehicle (e.g., a mobile communication device, such as a cell phone or a personal digital assistance (PDA))), or a speedometer of vehicle 100. Motion detector 395 may communicate with server 220, for example. Motion detector 395 may provide signals to server 220, where server 220 may control the electronic displays 110 based on the detected motion of vehicle 100. For example, in one implementation, motion detector 395 may detect that vehicle 100 is moving. Motion detector 395 may send a signal to server 220, for example. In response to the receipt of the signal from motion detector 395, server 220 may prevent the electronic display 110 from displaying the still image 116 or the moving image 121. In an alternative implementation, in response to the receipt of the signal from motion detector 395, server 220 may prevent the electronic display 110 from displaying the moving image 121, but may allow the electronic display 110 to display the still image 116. (As shown, e.g., in FIG. 1C.)

When motion detector 395 detects that the vehicle has stopped or that a vehicle's speed has dropped below a particular threshold, motion detector 395 may provide a second signal to server 220, for example. In response to a second signal from motion detector 395, server 220 may allow still image 116 or moving image 121 to be presented on electronic display 110. (As shown, e.g., in FIG. 1D.) In an implementation where motion detector 395 is separate from vehicle 110, motion detector 395 may communicate with processor 310 via any known manner, such as via radio, WiFi, Bluetooth, infrared, WiMax, etc. (e.g., as described above in connection with FIG. 5).

In an alternative implementation, rather than sending signals from motion detector 395 to server 220, a processor 310, associated with electronic display 110, for example, may locally control configured display information 690, as discussed above in connection with FIG. 5.

Although FIG. 6 shows example components of network portion 600, in other implementations, network portion 600 may contain fewer, different, differently arranged, or additional components than depicted in FIG. 6. In still other implementations, one or more components of network portion 600 may perform one or more other tasks described as being performed by one or more other components of network portion 600. For example, in one example implementation, server 220 may be omitted and user device 210 may perform the functions described as being performed by server 220.

Figure 7:
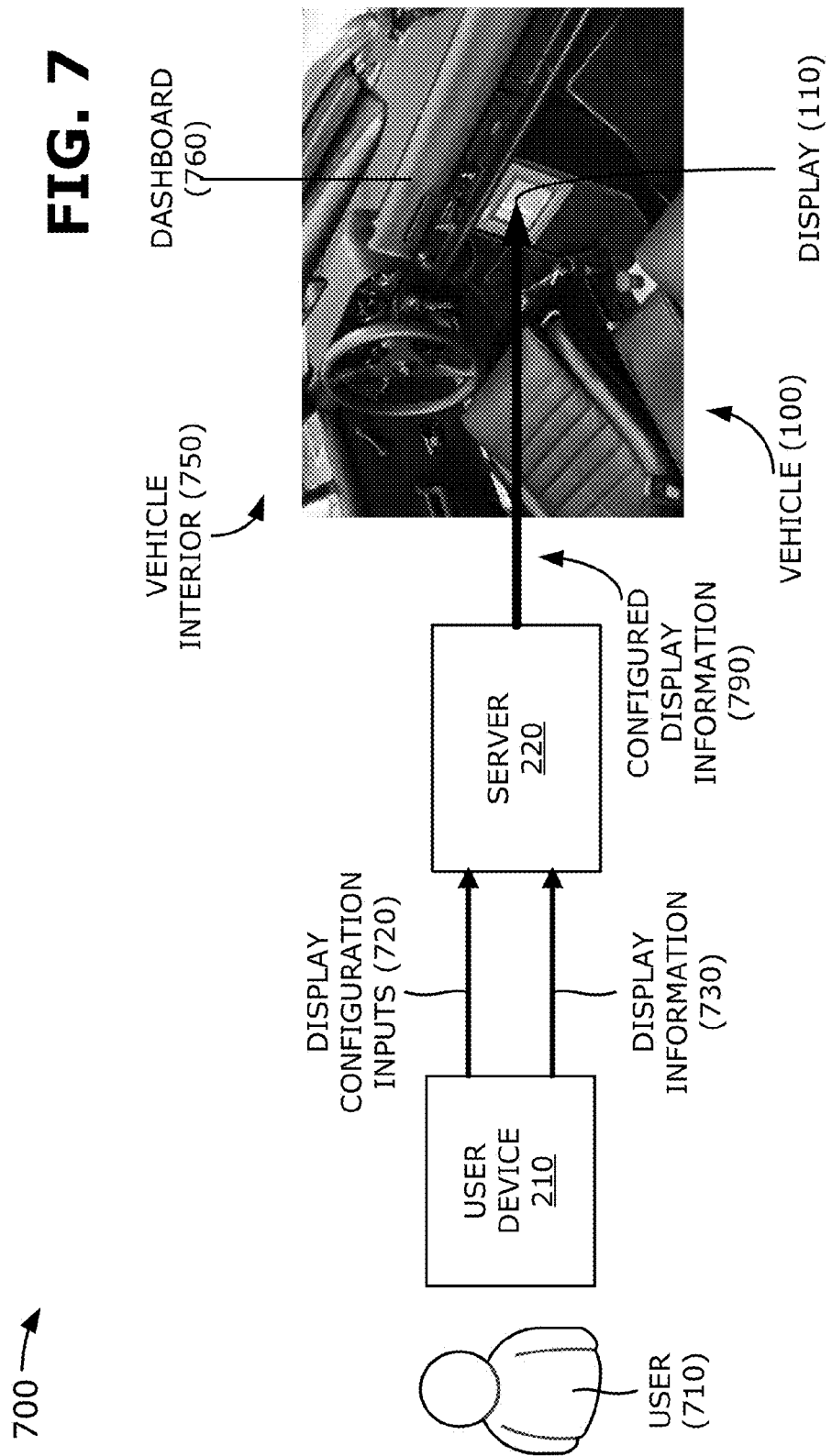
FIG. 7 shows a diagram of an electronic display configuration capable of being provided by an example portion of the network illustrated in FIG. 2.

FIG. 7 depicts a diagram of example display configuration operations capable of being performed by an example portion 700 of network 200. As illustrated, example network portion 700 may include a user device 210, a server 220 and an electronic display 110 located in a vehicle interior 750 of a vehicle 100. User device 210, server 220, electronic display 110, and vehicle 100 may include the features described above in connection with, for example, FIGS. 1A-4.

As further shown in FIG. 7, a user 710 may be associated with server 220. In one implementation, user 710 may include an employee or an owner of a product or service provider that wishes to display messages (e.g., an advertisement or a promotion for a product or service) on the electronic display 110. User 710 may access server 220 (e.g., via a password or account information), and may provide display configuration inputs 720 or display information 730 to server 220. Display configuration inputs 720 may include user's 710 selection of a display (e.g., a display stored in a memory associated with server 220), user's 710 creation of a custom display (e.g., rather than selecting a display), etc. Display information 730 may include textual information, graphical information, video information, etc. to be included in the selected/created display. Display information 730 may also include audio information associated with the textual information, graphical information, or video information. For example, in one implementation, user 710 may provide display configuration inputs 720 or display information 730 associated with a current promotion being offered by the product or service provider. Display information 730 may be presented, by electronic display 110, as a still image 116, a moving image 121, or a combination thereof.

Server 220 may receive a variety of information from other sources (e.g., as shown in connection with FIG. 5), and may create configured display information 790 based on display configuration inputs 720, display information 730, or the variety of information from other sources. (As discussed above in connection with FIG. 5, for example.) Configured display information 790 may include information capable of being presented by electronic display 110. For example, in one implementation, configured display information 790 may include textual information, graphical information, video information, or audio information, as described above, in connection with, for example, FIGS. 1A-1D. As also described above, in connection with, for example, FIGS. 1A-1D, the textual information, graphical information, or video information may be provided as a still image 116, a moving image 121, or a combination thereof. Electronic display 110 may receive configured display information 790, and may display configured display information 790.

In one example, configured display information 790 may include information for providing display 110 with the current promotion offered by the product or service provider. The arrangement depicted in FIG. 7 may enable the product or service provider to display the promotion on an electronic display 110 located in a vehicle interior 750 of vehicle 100. For example, in one implementation electronic display 110 may be associated with a global positioning system (GPS) or an audio system of vehicle 100. Although, electronic display 110 is depicted as being located in a dashboard 760 of vehicle 100, the location of electronic display 110 is not so limited. For example, electronic display 110 may be a heads-up display located on a windshield of vehicle 100.

In another implementation (e.g., as discussed above in connection with FIG. 5), configured display information 690 may include emergency information 570, or traffic information 580.

Speaker 125 (not shown) may also generate audio based on configured display information 790. For example, audio information may be extracted from configured display information 790, converted to a format capable of being generated by speaker 125. Converted audio information may then be provided to speaker 125, which may generate configured audio. For example, a speaker 125 of a GPS or a speaker 125 of an audio system of vehicle 100 may generate configured audio.

In one example implementation, server 220 may customize configured display information 790 based on vehicle 100 being in a geographical proximity to a particular geographic location. In such a scenario, server 220 may provide certain customized configured display information 790 to electronic display 110 when vehicle 100 is within a certain geographic proximity of a geographic location of user 710. For example, if user 710 is associated with a particular business, electronic display 110 may display an advertisement associated with the particular business when vehicle 100 is within a particular geographic proximity of the geographic location of the particular business.

Similar to the implementation depicted in FIG. 6, vehicle 100 may include a motion detector 395 for detecting motion of vehicle 100. In the example implementation of FIG. 7, a motion detector 395, for detecting motion of vehicle 100, may be included. The implementation of motion detector 395 may be similar to the implementation of motion detector 395, as described above in connection with FIG. 6.

Although FIG. 7 shows example components of network portion 700, in other implementations, network portion 700 may contain fewer, different, differently arranged, or additional components than depicted in FIG. 7. In still other implementations, one or more components of network portion 700 may perform one or more other tasks described as being performed by one or more other components of network portion 700. For example, in one example implementation, server 220 may be omitted and user device 210 may perform the functions described as being performed by server 220.

Figure 8:
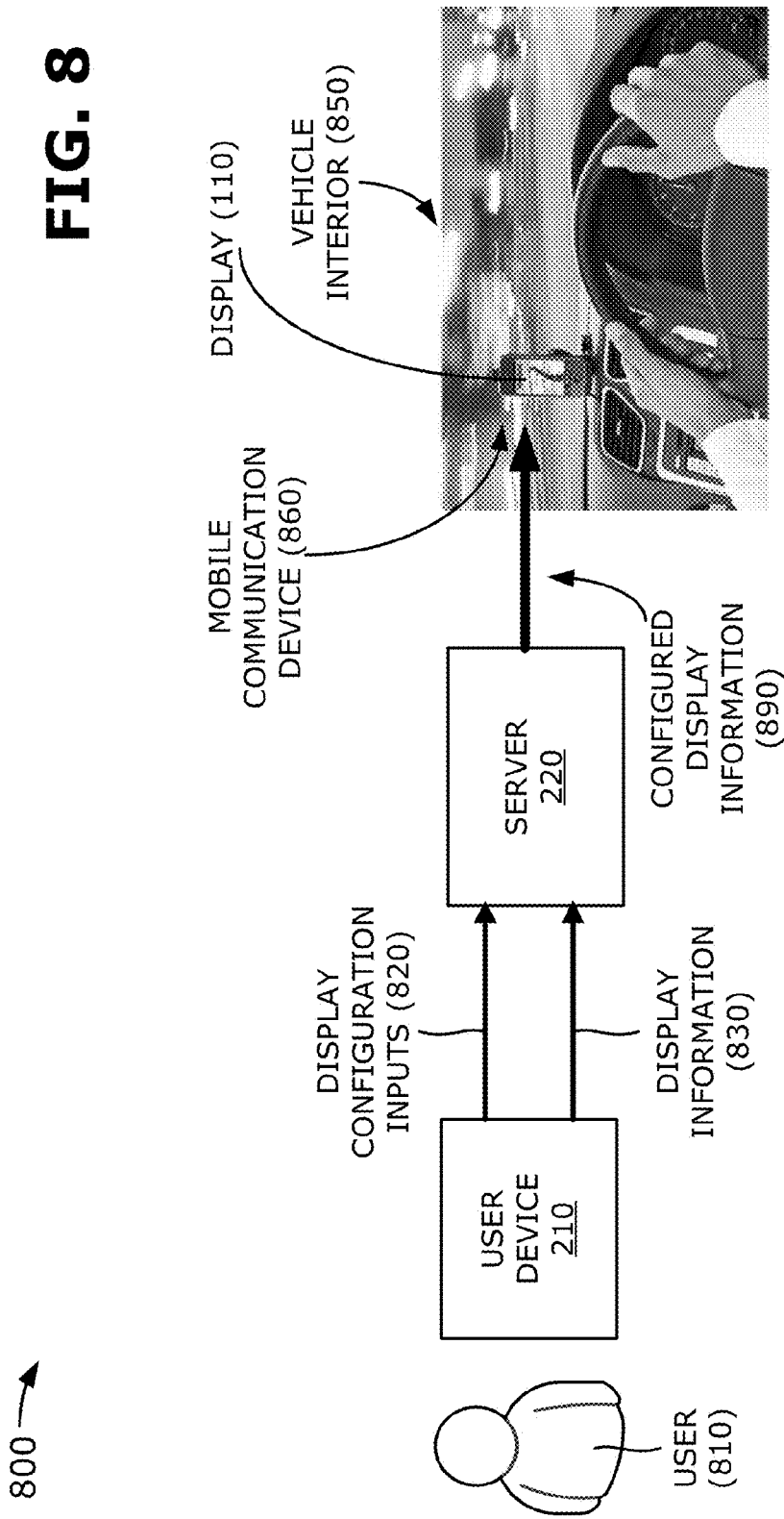
FIG. 8 shows a diagram of electronic display configuration capable of being provided by an example portion of the network illustrated in FIG. 2.

FIG. 8 depicts a diagram of example display configuration operations capable of being performed by an example portion 800 of network 200. As illustrated, example network portion 800 may include, a user device 210, a server 220, and an electronic display 110 associated with a mobile communication device 860, such a cellular telephone or a PDA. User device 210, server 220, electronic display 110, and vehicle 100 may include the features described above in connection with, for example, FIGS. 1A-4. The operation of the implementation of FIG. 8 is similar to the operation of the implementation depicted in FIG. 7 above.

Although FIG. 8 shows example components of network portion 800, in other implementations, network portion 800 may contain fewer, different, differently arranged, or additional components than depicted in FIG. 8. In still other implementations, one or more components of network portion 800 may perform one or more other tasks described as being performed by one or more other components of network portion 800. For example, in one example implementation, server 220 may be omitted and user device 210 may perform the functions described as being performed by server 220.

Figure 9:
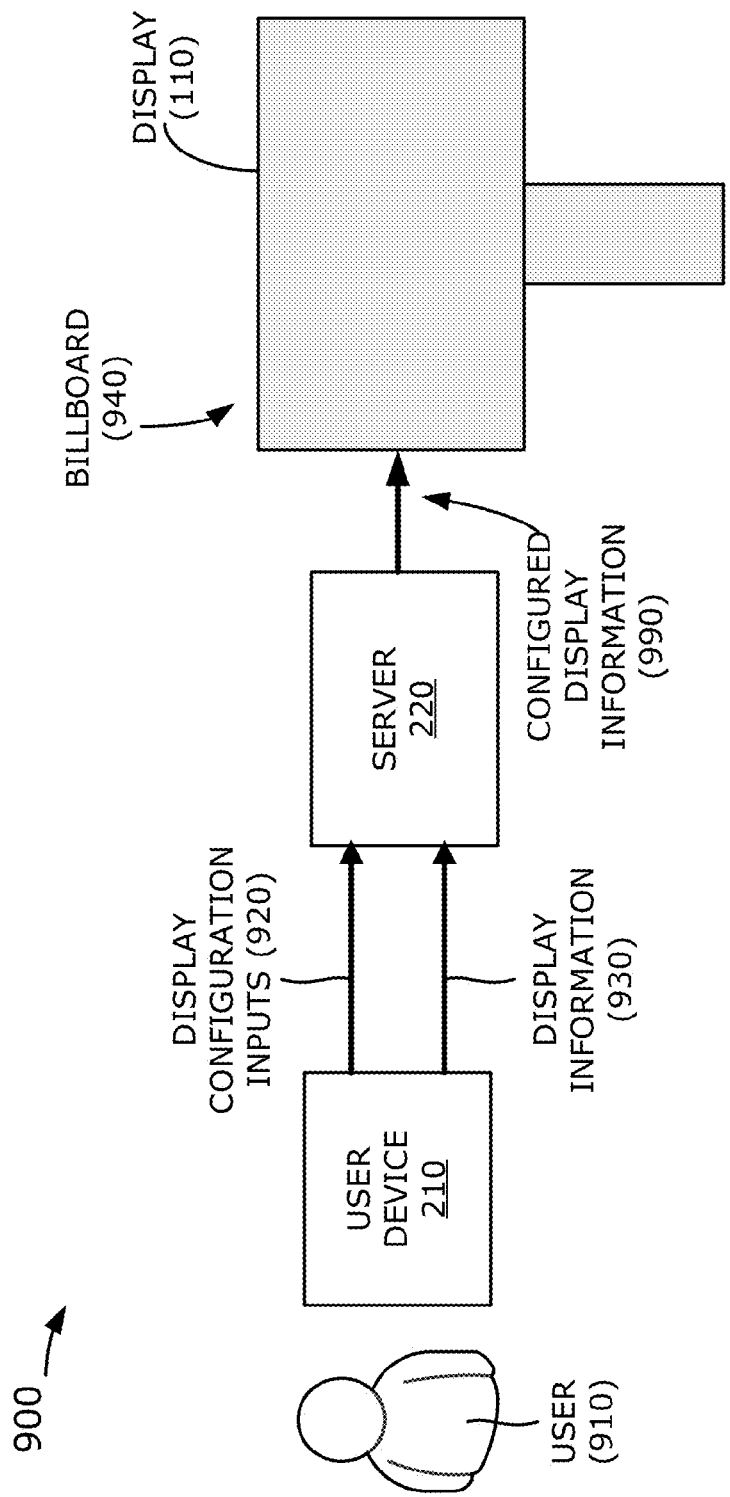
FIG. 9 shows a diagram of an electronic display configuration capable of being provided by an example portion of the network illustrated in FIG. 2.

FIG. 9 shows a diagram of example display configuration operations capable of being performed by an example portion 900 of network 200. As illustrated, example network portion 900 may include, a user device 210, a server 220, and a stationary electronic display 110, such as a billboard 940. The stationary electronic display 110 is not limited to a billboard and may include any type of stationary display that is capable of displaying an image. Server 220 and electronic display 110 may include the features described above in connection with, for example, FIGS. 1A-8. The general implementation of the display configuration of FIG. 9 has been discussed above, in connection with FIGS. 5-8. The specific implementation of display configuration of FIG. 9 will be discussed below, in connection with FIGS. 10-16.

Figure 10:
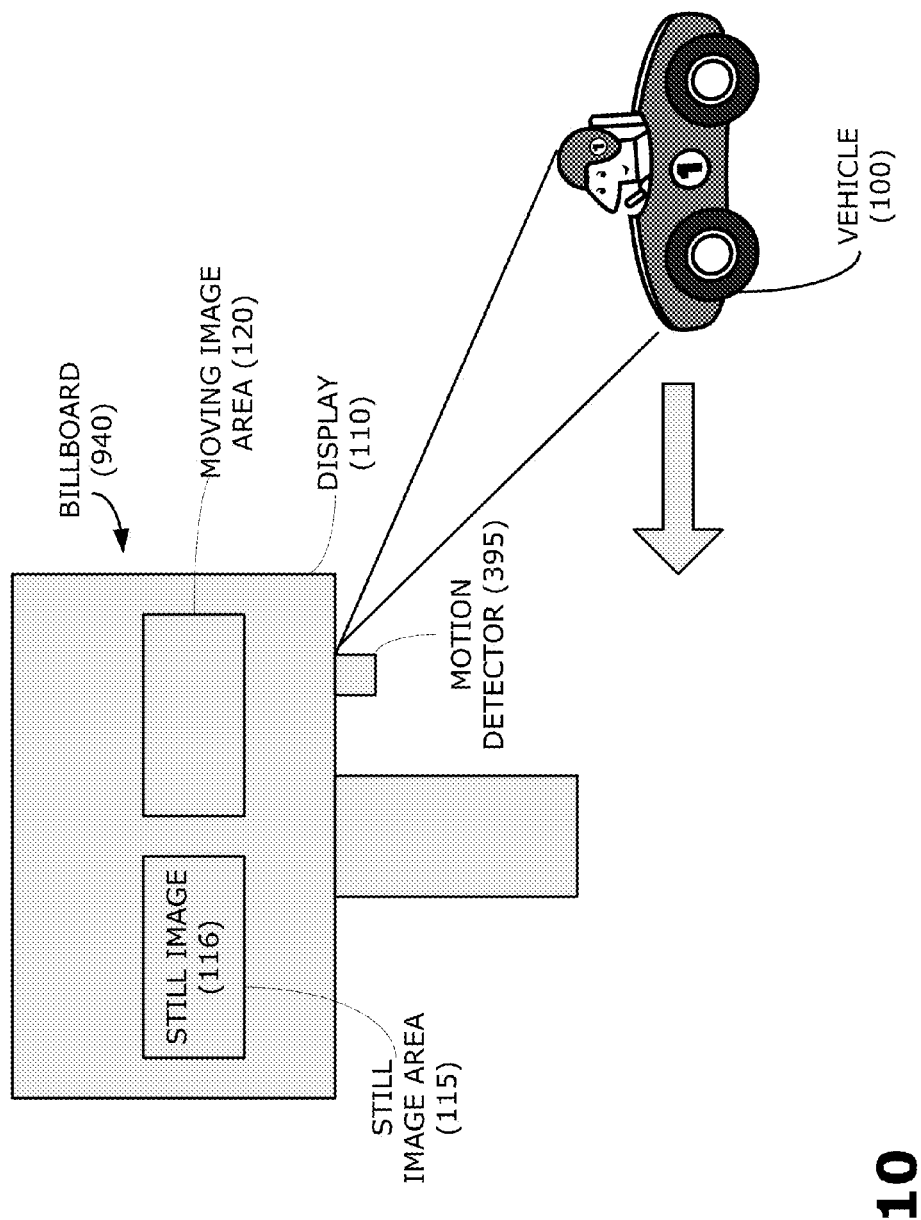
FIG. 10 shows a diagram of an operation of an example electronic display according to an implementation described herein.
Figure 11:
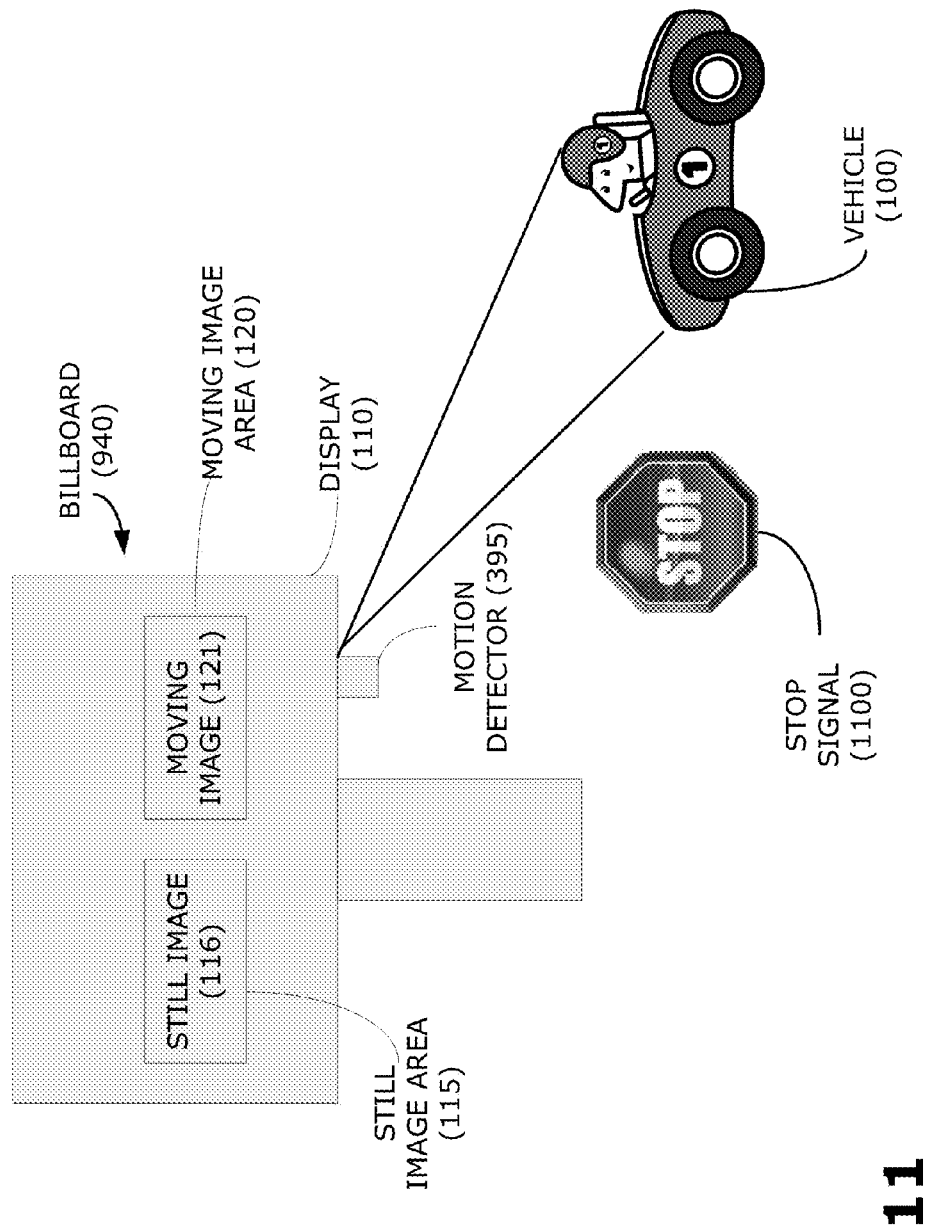
FIG. 11 shows a diagram of an operation of an example electronic display according to an implementation described herein.

FIGS. 10 and 11 depict an example implementation of the display configuration shown in FIG. 9. Billboard 940 may include an electronic display 110 that may include a still image area 115, for displaying a still image 116, and a moving image area 120 for displaying a moving image. Billboard 940, or the electronic display 110, may include a motion detector 395 that is capable of detecting a motion of a vehicle 100, as is well known.

For example, motion detector 395 may detect the motion of vehicle 100 in any know manner, including infrared (IR), radar, or, ultrasonic waves. Motion detector 395 may be located anywhere on billboard 940 or the electronic display 110. In an alternative implementation, motion detector 395 may be remotely located from billboard 940, or the electronic display 110, and may communicate with billboard 940 or electronic display 110, either in a wired or wireless manner.

As discussed above, in connection with FIGS. 5-8, motion detector 395 may communicate with server 220, for example, where server 220 may control the display of configured display information based on the detected motion of vehicle 100. As also discussed in connection with FIGS. 5-8, in an alternative implementation, rather than sending signals from motion detector 395 to server 220 to control configured display information 990, a processor 310, associated with electronic display 110, for example, may locally control configured display information 990 as discussed above (e.g., in connection with FIGS. 5 and 9).

For example, in one implementation (as shown in FIG. 10) motion detector 395 may detect that vehicle 100 is moving. Motion detector 395 may send a signal to server 220, for example. In response to the receipt of the signal from motion detector 395, server 220 may prevent electronic display 110 from displaying a moving image 121, while allowing display 110 to present still image 116.

When motion detector 395 detects that the vehicle has stopped (as indicated by stop signal 1100) or that the vehicle's speed has dropped below a particular threshold (as shown in FIG. 11), motion detector 395 may provide a second signal to server 220. In response to the second signal from motion detector 395, server 220 may allow the still image 116 or the moving image 121 to be presented on the electronic display 110. (As shown, e.g., in FIG. 1D and FIG. 11.)

As also discussed in connection with FIGS. 5-8, in an alternative implementation, rather than sending signals from motion detector 395 to server 220 to control display configuration information 990, a processor 310, associated with the electronic display 110, for example, may locally control configured display information 990, as discussed above (e.g., in connection with FIG. 5).

Audio information, associated with the still image 116 or the moving image 121, may be produced through a speaker 125 (not shown) even if vehicle 100 is moving. For example, if motion detector 395 detects that vehicle 100 is moving, a moving image 121 may not be presented on electronic display 110. However, audio information, associated with moving image 121, may be produced through speaker 125. Speaker 125 may be associated with vehicle 100 (e.g., a speaker of a sound system or GPS) or speaker 125 may be a speaker associated with mobile communication device 860.

In an alternative implementation, motion detector 395 may be located in vehicle 100 or a mobile communication device 860, as described above in connection with FIGS. 5-8. In such an alternative implementation, motion detector 395 (located in vehicle 100 or the mobile communication device 860) may communicate with server 220, or alternatively, the electronic display 110, located on billboard 940, where server 220 or a processor associated with electronic display 110, may control electronic display 110 as described above in connection with FIGS. 5-8. In an example implementation, motion detector 395 may be associated with a GPS located in vehicle 100 or a mobile communication device 860.

Figure 12:
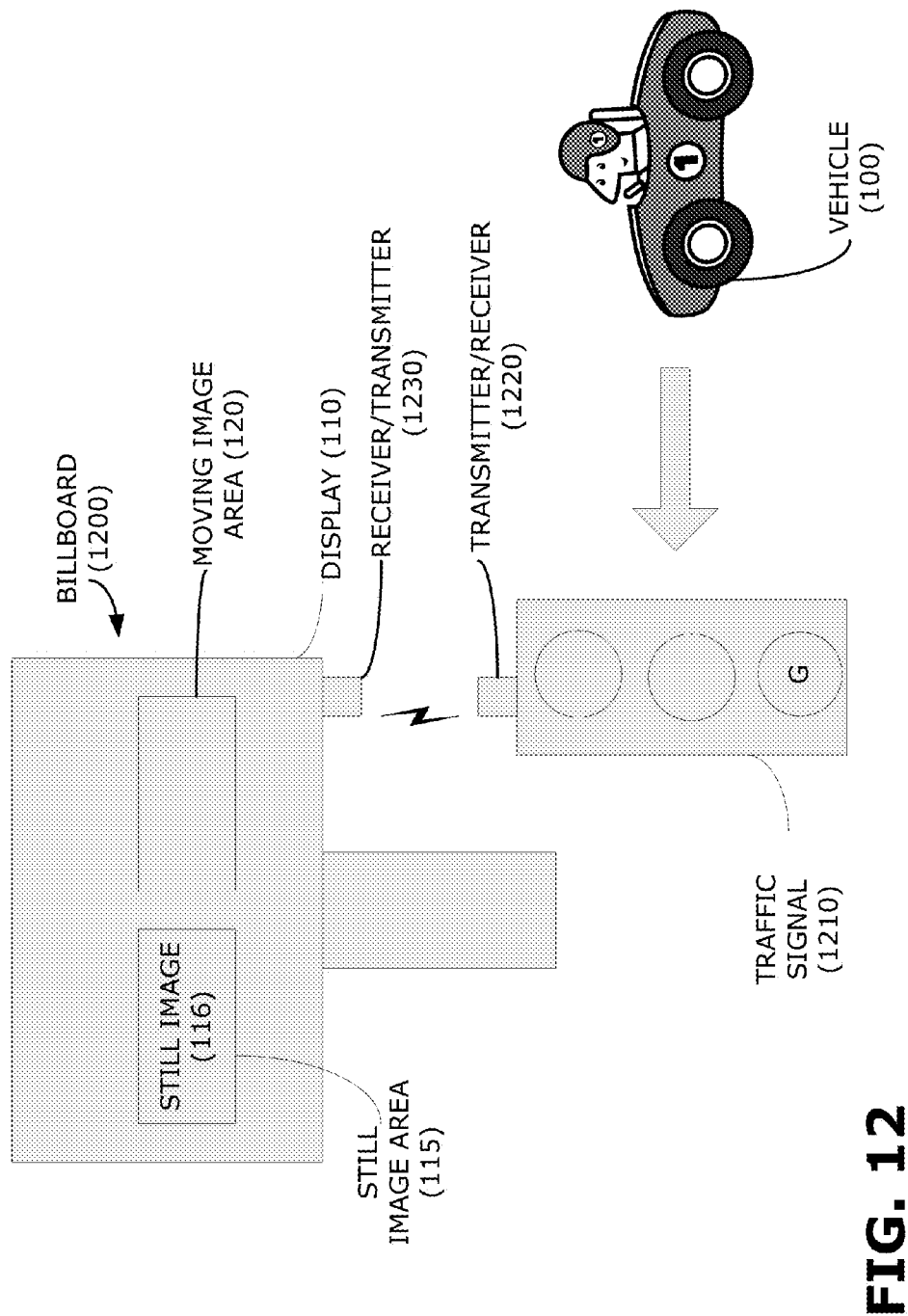
FIG. 12 shows a diagram of an operation of an example electronic display according to an implementation described herein.
Figure 13:
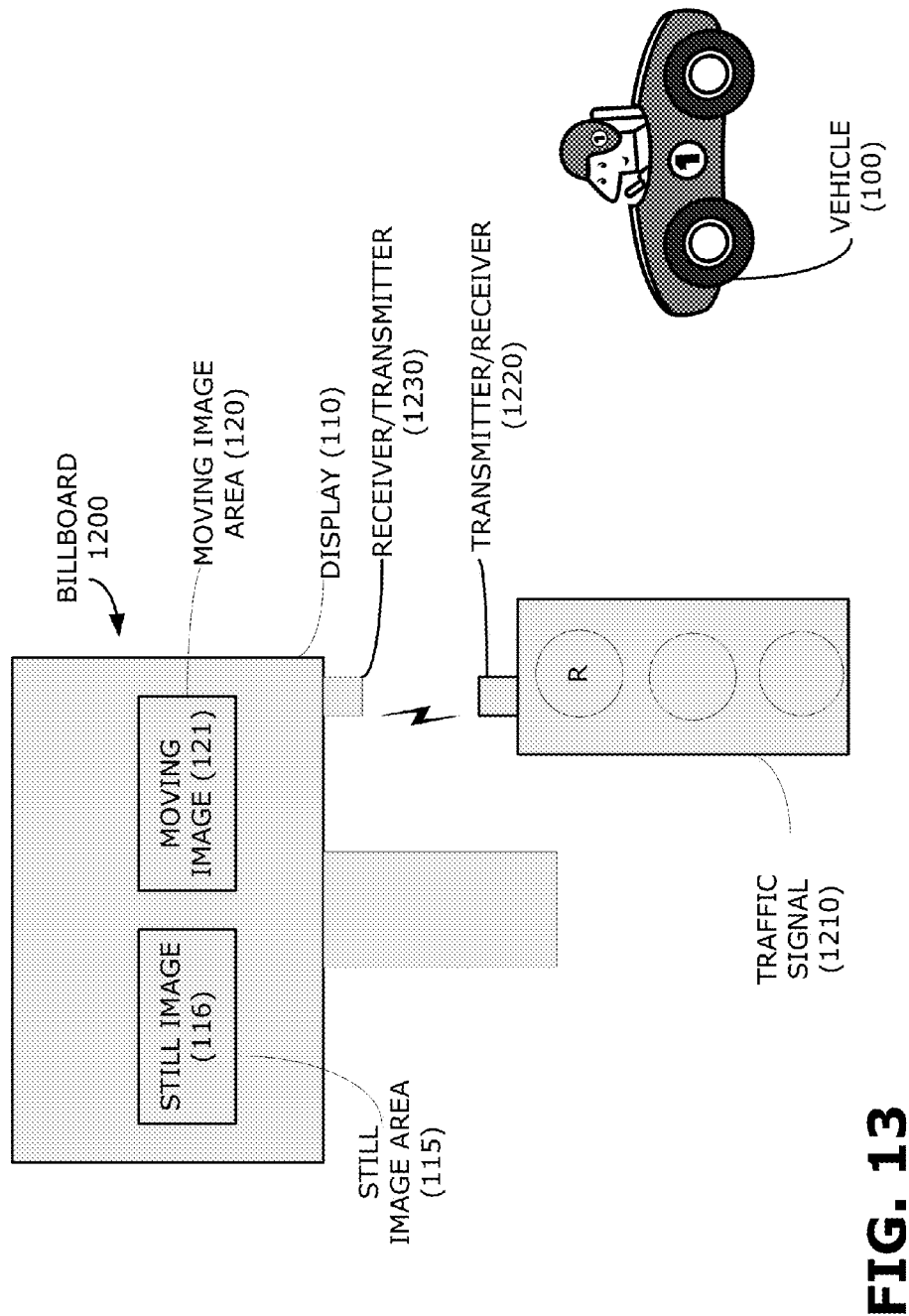
FIG. 13 shows a diagram of an operation of an example electronic display according to an implementation described herein.

FIGS. 12 and 13 depict an example implementation of the display configuration shown in FIG. 9. As described above, in connection with FIGS. 10 and 11, a billboard 1200 may include an electronic display 110 that may include a still image area 115, for displaying a still image 116, and a moving image area 120, for displaying a moving image.

In the example implementation shown in FIGS. 12 and 13, billboard 1200, or electronic display 110, may include a receiver/transmitter 1230 that may communicate with a transmitter/receiver 1220 located on a traffic signal 1210 that is in proximity to billboard 1200 or electronic display 110. Alternatively, the transmitter/receiver 1220 may be remotely located from traffic signal 1210. Receiver/transmitter 1230 may be located anywhere on billboard 1200 or electronic display 110, or receiver/transmitter 1230 may be remotely located from billboard 1200 or electronic display 110, and may communicate with billboard 1200 or electronic display 110, either in a wired or wireless manner, as is known. The transmitter/receiver 1220 may be located anywhere on the traffic signal 1210 and may communicate with the receiver/transmitter 1230 via any known communication method, including radio, WiFi, Bluetooth, infrared, WiMax, etc. In an alternative implementation, traffic signal 1210 and billboard 1200, or electronic display 110, may communicate by being hardwired together.

For example, in one example implementation (as shown in FIG. 12), traffic signal 1210 may indicate that traffic may proceed (e.g., traffic signal may turn green). Traffic signal 1210 may send a signal from transmitter/receiver 1220 to a receiver/transmitter 1230 that is located on billboard 1200 or the electronic display 110, the signal indicating that electronic display 110 is to stop displaying the moving image in moving image area 120. In response to receiving the signal, electronic display 110 may cease displaying a moving image in moving image area 120. In another example implementation, electronic display 110 may cease displaying both the moving image and still image 116. In still another example implementation, traffic signal 1210 may send the signal, indicating that display is to stop displaying moving image 120 or still image 116, before traffic signal 1210 indicates that traffic may proceed (e.g., changes to a green color). For example, the signal indicating that electronic display 110 is to stop displaying the moving image 120 or still image 116 may be sent at a particular time before traffic signal 1210 changes to indicate that traffic can proceed.

As shown in FIG. 13, when traffic signal 1210 indicates that traffic is to stop (e.g., traffic signal turns red), traffic signal 1210 may send a signal from transmitter/receiver 1220 to receiver/transmitter 1230 that is located on billboard 1200 or electronic display 110, the signal indicating that the electronic display 110 is to display moving image 121 in moving image area 120. In another example implementation, electronic display 110 may display both moving image 121 and still image 116 in response to the signal sent by traffic signal 1210.

In an alternative implementation, electronic display 110 may be associated with vehicle 100. For example, electronic display 110 may be located in an interior or on an exterior of vehicle 100. For example, as described above, in connection with FIGS. 5-8, electronic display 110 may be an in-vehicle display (as shown in FIG. 7) or may be associated with a mobile communication device 860 (as shown in FIG. 8). In such an alternative implementation, transmitter/receiver 1220, which may be associated with traffic signal 1210, may communicate with a receiver/transmitter that may be associated with electronic display 110. For example, transmitter/receiver 1220 may communicate with a receiver/transmitter that may be associated with mobile communication device 860.

Although FIGS. 9-13 show example components of network portion 900, in other implementations, network portion 900 may contain fewer, different, differently arranged, or additional components than depicted in FIGS. 9-13. In still other implementations, one or more components of network portion 900 may perform one or more other tasks described as being performed by one or more other components of network portion 900. For example, in one example implementation, server 220 may be omitted and user device 210 may perform the functions described as being performed by server 220.

Figure 14:
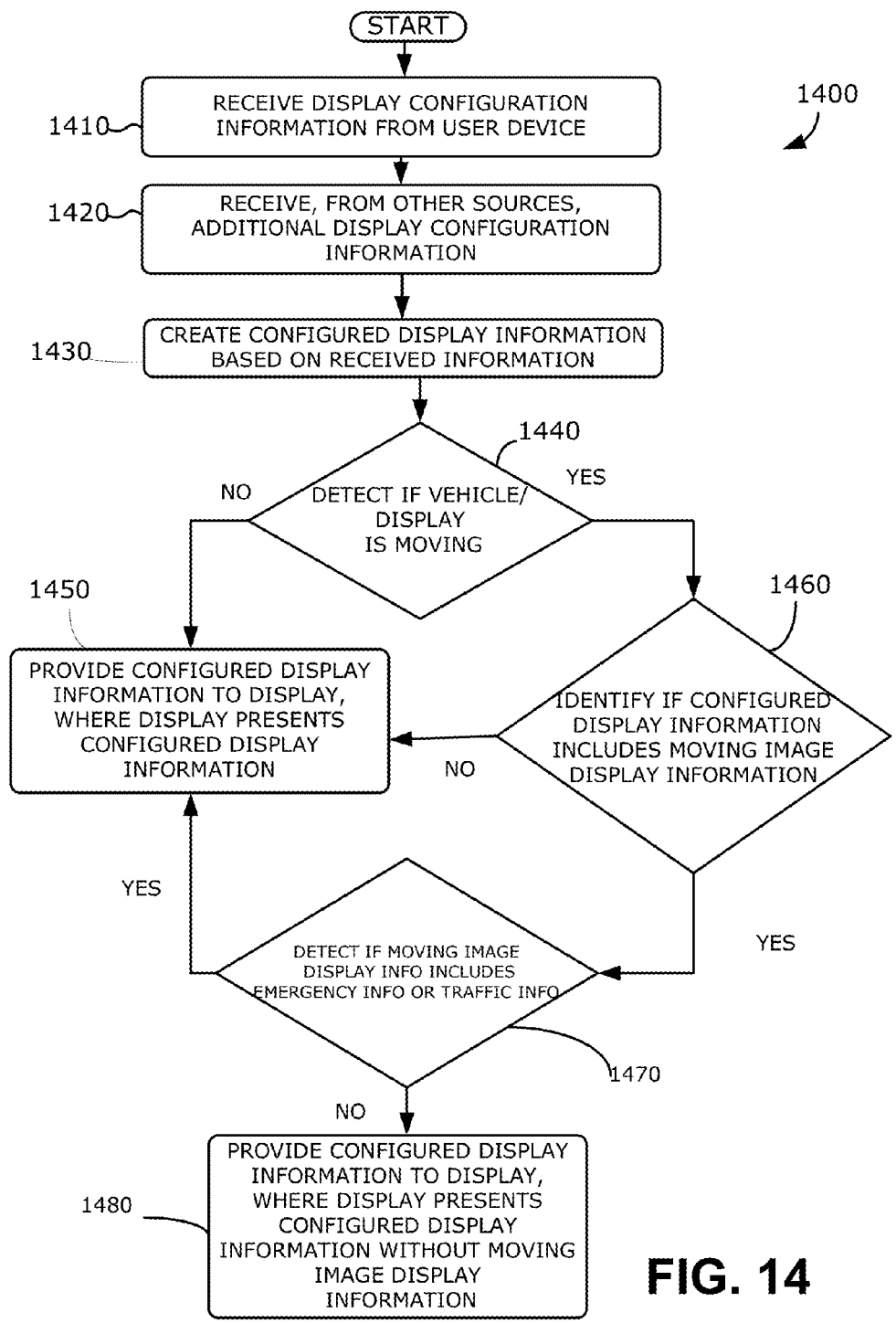
FIGS. 14-16 show flow charts of example processes for displaying an image on an electronic display according to implementations described herein.
Figure 15:
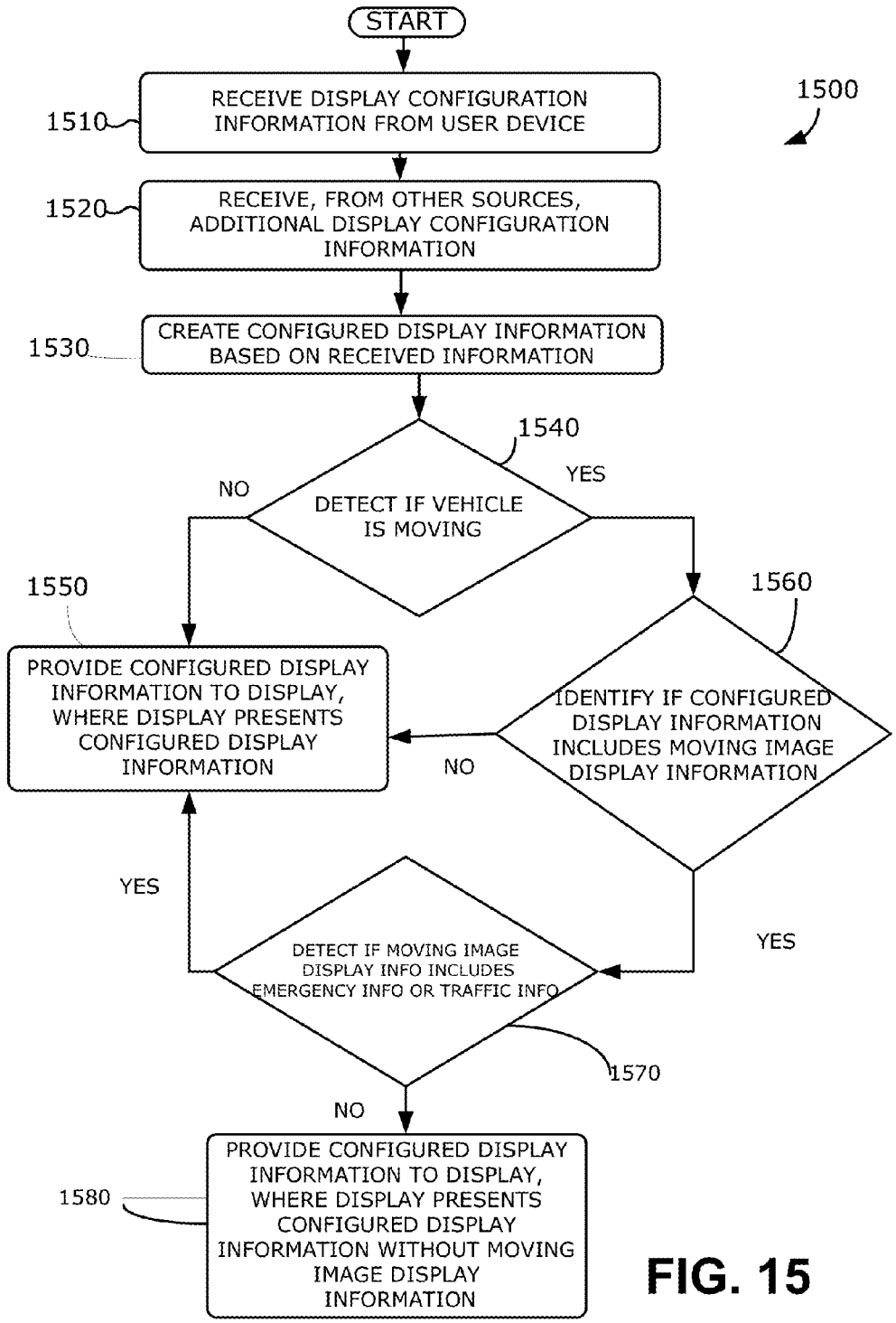
Figure 16:
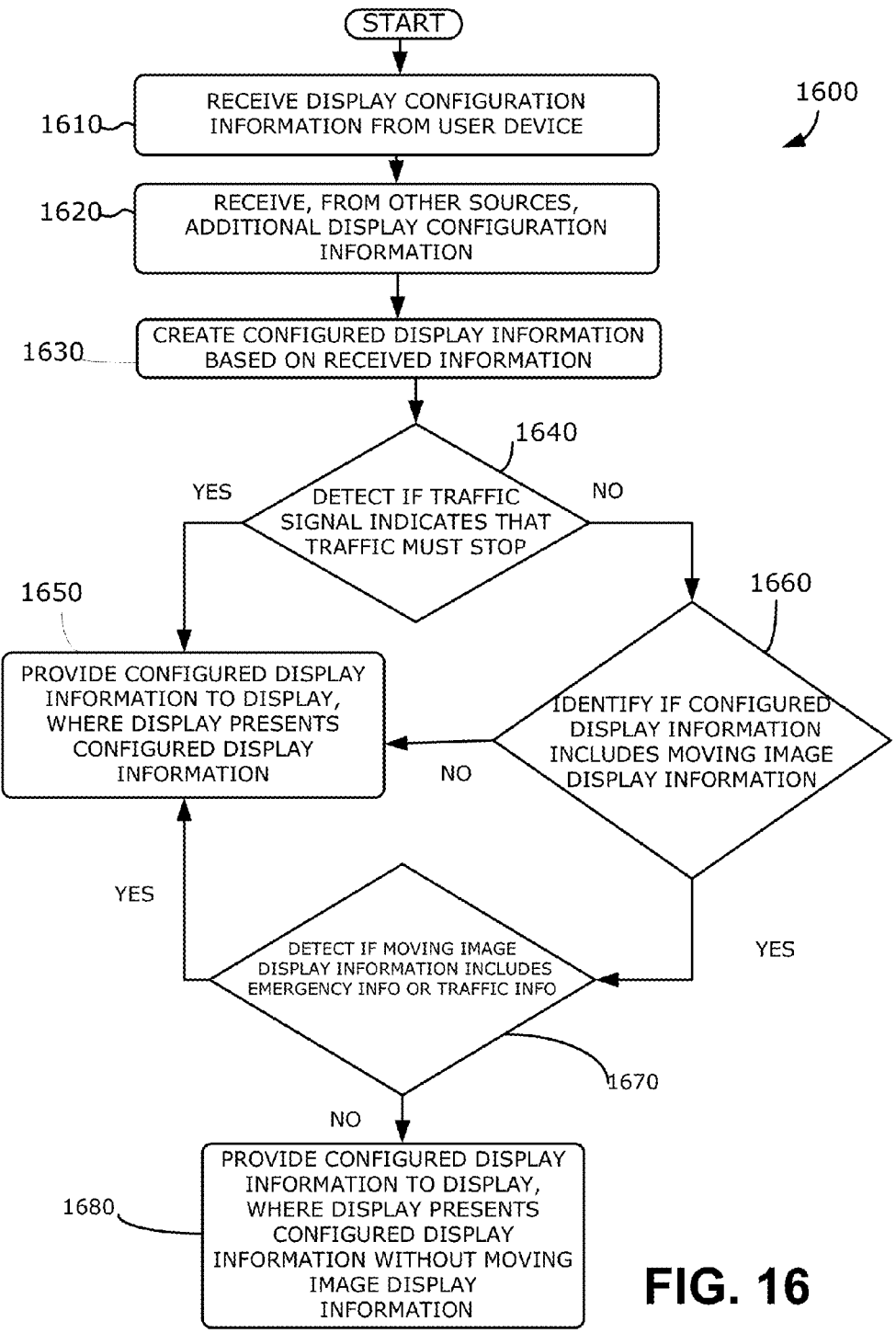

FIGS. 14-16 depict flow charts of example processes 1400, 1500, and 1600, respectively, for configuring a display, according to implementations described herein. In one implementation, server 220 may perform processes 1400, 1500, and 1600. In another implementation, another device (e.g., user device 210 or electronic display 110) or group of devices, including or excluding server 220, may perform some or all of the processes 1400, 1500, and 1600.

As illustrated by FIG. 14, process 1400 may include receiving display configuration information from a user device (block 1410), and receiving, from other sources, additional display configuration information (block 1420). For example, in an implementation described above in connection with FIG. 5, user 510 (e.g., via user device 210) may provide display configuration inputs 520 or display information 530 to a server 220. Display configuration inputs 520 may include a user 510 selection of a display, a user 510 creation of a custom display, etc. Display information 530 may include textual information, graphical information, video information, etc. to be included in the selected/created display. Display information 530 may also include audio information associated with the textual information, graphical information, or video information. Server 220 may receive advertisement (ad) information 540 for an electronic display 110 from one or more providers of a product or service, may receive pre-created displays 550 from a producer of displays (e.g., similar to a producer of bumper stickers), and may receive friend displays 560 from friends of user 510. Server 220 may receive emergency information 570 from state or federal agencies (e.g., in the event of a state or national emergency) or from a manufacturer of vehicle 100, and may receive traffic information 580 from state or local agencies (e.g., in the event of traffic problems).

As further shown in FIG. 14, configured display information may be created based on the received information (block 1430). It may be determined whether vehicle 100 or electronic display 110 is in motion (block 1440). As described with respect to an implementation associated with FIGS. 5-8, motion detector 395 may be affixed to a vehicle 100 (as shown, e.g. in FIGS. 5-7), motion detector 395 may be located in mobile device 860 (as shown in FIG. 8), or motion detector 395 may be located external to vehicle 100 (as shown in FIGS. 10 and 11).

If motion detector 395 determines (block 1440) that vehicle 100 or electronic display 110 is not moving, or in an alternative implementation, that a speed of the motion of vehicle 100 or electronic display 110 is below a particular threshold (block 1440-NO), then configured display information may be provided to electronic display 110, where the electronic display 110 presents configured display information (block 1450). For example, in an implementation described above in connection with FIG. 5, server 220 may utilize one or more of display information 530, advertisement information 540, pre-created signs 550, friend signs 560, emergency information 570, or traffic information 580 to create configured display information 590 that may be presented by electronic display 110. Configured display information 590 may include information capable of being presented by electronic display 110. Server 220 may provide configured display information 990 to electronic display 110, and electronic display 110 may receive and provide configured display information 590 (e.g., via electronic display 110 or speaker 125).

If motion detector 395 determines (block 1440) that vehicle 100 or electronic display 110 is moving, or in an alternative implementation, that a speed of the motion of vehicle 100 or electronic display 110 is above the particular threshold (block 1440-YES), then it may be determined (e.g., by server 220) whether configured display information 590 includes moving image information (block 1460). As discussed above, the moving image information may include, for example, textual information, graphical information, or video information. If configured display information 590 does not include moving image information (block 1460-NO), then configured display information 590 may be provided to electronic display 110, where electronic display 110 presents configured display information 590 (block 1450). For example, if configured display information 590 only includes still image display information (block 1460-NO), then the still image display information may be presented on electronic display 110.

If configured display information 590 includes moving image information (block 1460-YES), then it may be determined (e.g., by server 220) whether the moving image display information includes emergency information 570 or traffic information 580 (block 1470). As discussed above, emergency information 570 may include, e.g., weather information, evacuation information or warnings associated with operation of vehicle 100 or vehicle passengers, such as a warning indicating an operate condition of vehicle 100 or a health emergency associated with a vehicle 100 passenger. As also discussed above, traffic information 580 may include traffic accident information, traffic congestion information, lane closing information, or road construction information.

If the moving image display information includes emergency information 570 or traffic information 580 (block 1470-YES), then configured display information 590 (including the moving image information) may be provided to electronic display 110, where electronic display 110 presents configured display information (block 1450), which may include a moving image 121 that includes emergency information 570 or traffic information 580. For example, if the moving image information includes emergency information 570 relating, for example, to a traffic emergency, then electronic display 110 may display a moving image associated with the moving image information, even though electronic display 110 or vehicle 100 is moving.

If the moving image display information does not include emergency information 570 or traffic information 580 (block 1470-NO), then configured display information 590 may be provided to electronic display 110, where electronic display 110 presents configured display information, but does not display the moving image display information (block 1480). For example, if configured display information 590 includes both still image display information and moving image display information, and the moving display information is not emergency information 570 or traffic information 580, then only the still image data may be presented on electronic display 110.

As illustrated by FIG. 15, process 1500 may include receiving display configuration information from a user device (block 1510), and receiving, from other sources, additional display configuration information (block 1520). For example, in an implementation described above in connection with FIG. 9, user 910 (e.g., via user device 210) may provide display configuration inputs 920 or display information 930 to a server 220. The display configuration inputs 920 may include a user 910 selection of a display, a user 910 creation of a custom display, etc. Display information 930 may include textual information, graphical information, video information, etc. to be included in the selected/created sign. Display information 930 may also include audio information associated with the textual information, graphical information, or video information. Server 220 may receive advertisement (ad) information 540 for an electronic display 110 from one or more providers of a product or service, may receive pre-created displays 550 from a producer of displays (e.g., similar to a producer of bumper stickers), and may receive friend displays 560 from friends of user 910. Server 220 may receive emergency information 570 from state or federal agencies (e.g., in the event of a state or national emergency) or from a manufacturer of vehicle 100, and may receive traffic information 580 from state or local agencies (e.g., in the event of traffic problems).

As further shown in FIG. 15, configured display information may be created based on the received information (block 1530). It may be determined whether vehicle 100 is moving (block 1540). As shown in connection with FIGS. 10 and 11, a motion detector 395 may be associated with an electronic display 110 that is remotely located from vehicle 100. For example, motion detector 395 and electronic display 110 may be located on a roadside billboard 940. As discussed above (in connection with FIGS. 10 and 11), motion detector 395 may use one or more of infrared (IR), radar, ultrasonic waves, to detect the motion of vehicle 100. Motion detector 395 may be located anywhere on billboard 940 or electronic display 110. In an alternative implementation, motion detector 395 may be remotely located from billboard 940, or electronic display 110, and may communicate with billboard 940 or electronic display 110, either in a wired or wireless manner.

As discussed above (in connection with FIGS. 10 and 11), in an alternative implementation, a motion detector may be located in vehicle 100 or a mobile communication device 860, as described above in connection with FIGS. 5-8. In such an alternative implementation, motion detector (located in vehicle 100 or the mobile communication device 860) may communicate with electronic display 110, located on billboard 940, to control electronic display 110, as described above in connection with FIGS. 5-8. In an example implementation, motion detector may be in a GPS located in vehicle 100 or a mobile communication device.

If it is determined that vehicle 100 is not moving, or in an alternative implementation, that a speed of vehicle 100 is below a particular threshold (block 1540-NO), then configured display information may be provided to electronic display 110 that is affixed, for example, to the roadside billboard 1000, where the electronic display 110 presents configured display information (block 1550). For example, in an implementation described above, in connection with FIGS. 10 and 11, server 220 may utilize one or more of display information 930, advertisement information 540, pre-created signs 550, friend signs 560, emergency information 570, traffic information 580 to create configured display information 990 that may be presented by electronic display 110. Configured display information 990 may include information capable of being presented by electronic display 110. Server 220 may provide configured display information 990 to electronic display 110, and electronic display 110 may receive and provide configured display information 990 (e.g., via electronic display 110 or speaker 125).

If it is determined that vehicle 100 is moving, or in an alternative implementation, that a speed of vehicle 100 is above the particular threshold (block 1540-YES), then it may be determined (e.g., by server 220) whether configured display information 990 includes moving image information (block 1560). As discussed above, the moving image information may include, for example, textual information, graphical information, or video information. If configured display information 990 does not include moving image information (block 1560-NO), then configured display information 990 may be provided to the electronic display 110, where the electronic display 110 presents configured display information 990 (block 1550). For example, if configured display information 990 only includes still image display information, then the still image display information may be presented on electronic display 110.

If configured display information 990 includes moving image information (block 1560-YES), then it may be determined (e.g., by server 220) whether the moving image display information includes emergency information 570 or traffic information 580 (block 1570). As discussed above, emergency information 570 may include, e.g., weather information or evacuation information. As also discussed above, traffic information 580 may include traffic accident information, traffic congestion information, lane closing information, or road construction information.

If the moving image display information includes emergency information 570 or traffic information 580 (block 1570-YES), then configured display information 990 (including the moving image information) may be provided to electronic display 110, where electronic display 110 presents configured display information 990 (block 1550), including a moving image 121 that includes emergency information 570 or traffic information 580. For example, if the moving image information includes information relating to a traffic emergency, then electronic display 110 may display a moving image associated with the moving image information, even though the vehicle 100 is moving.

If the moving image display information does not include emergency information 570 or traffic information 580 (block 1570-NO), then configured display information 990 may be provided to electronic display 110, where electronic display 110 presents configured display information 990, but does not present the moving image display information (block 1580). For example, if configured display information 990 includes both still image display information and moving image display information, and the moving display information is not emergency information 570 or traffic information 580, then only the still image data may be presented on electronic display 110.

As illustrated by FIG. 16, process 1600 may include receiving display configuration information from a user device (block 1610), and receiving, from other sources, additional display configuration information (block 1620). For example, in implementations described above (in connection with FIGS. 9-11), user 910 (e.g., via user device 210) may provide display configuration inputs 1020 or display information 1030 to a server 220. Display configuration inputs 920 may include a user 910 selection of a display, a user 910 creation of a custom display, etc. Display information 930 may include textual information, graphical information, video information, etc. to be included in the selected/created sign. Display information 930 may also include audio information associated with the textual information, graphical information, or video information. Server 220 may receive advertisement (ad) information 540 for an electronic display 110 from one or more providers of a product or service, may receive pre-created displays 550 from a producer of displays (e.g., similar to a producer of bumper stickers), and may receive friend displays 560 from friends of user 910. Server 220 may receive emergency information 570 from state or federal agencies (e.g., in the event of a state or national emergency) or from a manufacturer of vehicle 100, and may receive traffic information 580 from state or local agencies (e.g., in the event of traffic problems).

As further shown in FIG. 16, configured display information may be created based on the received information (block 1630). As discussed above (for example, in connection with FIGS. 12 and 13), a determination may be made as to whether a traffic signal 1210 indicates that must stop (e.g., the traffic signal may turn red) (block 1640).

If it is determined that the traffic signal 1210 indicates that traffic must stop (e.g., the traffic signal is red) (block 1640-YES), then configured display information 990 may be provided to electronic display 110 that is affixed, for example, to the roadside billboard 1000, where electronic display 110 presents configured display information 990 (block 1650). For example, in an implementation described above (in connection with FIGS. 12 and 13), server 220 may utilize one or more of display information 930, advertisement information 540, pre-created signs 550, friend signs 560, emergency information 570, traffic information 580 to create configured display information 990 that may be presented by electronic display 110. Configured display information 990 may include information capable of being presented by electronic display 110. Server 220 may provide configured display information 990 to electronic display 110, and electronic display 110 may receive and provide configured display information 990 (e.g., via electronic display 110 or speaker 125).

If it is determined that the traffic signal 1210 indicates that traffic may proceed (e.g., the traffic signal is green) (block 1640-NO), then it may be determined (e.g., by server 220) whether configured display information 990 includes moving image information (block 1660). As discussed above, the moving image information may include, for example, textual information, graphical information, or, video information. If configured display information 990 does not include moving image information (block 1660-YES), then configured display information 990 may be provided to electronic display 110, where electronic display 110 presents configured display information (block 1650). For example, if configured display information 990 only includes still image display information, then the still image display information may be presented on electronic display 110.

If configured display information 990 does include moving image information (block 1660-YES), then it may be determined (e.g., by server 220) whether the moving image display information includes emergency information 570 or traffic information 580 (block 1670). As discussed above, emergency information 570 may include, e.g., weather information or evacuation information. As also discussed above, traffic information 580 may include traffic accident information, traffic congestion information, lane closing information, or road construction information.

If the moving image display information includes emergency information 570 or traffic information 580 (block 1670-YES), then configured display information 990 (including the moving image information) may be provided to electronic display 110, where electronic display 110 presents configured display information 990 (block 1650), including a moving image 121 that includes emergency information 570 or traffic information 580. For example, if the moving image information includes information relating to a traffic emergency, then electronic display 110 may display a moving image 121 associated with the moving image information, even though the vehicle 100 may be moving.

If the moving image display information does not include emergency information 570 or traffic information 580 (block 1670-NO), then configured display information 990 may be provided to electronic display 110, where electronic display 110 presents configured display information 990, but does not display the moving image display information (block 1680). For example, if configured display information 990 includes both still image display information and moving image display information, and the moving display information is not emergency information 570 or traffic information 580, then only the still image data may be presented on electronic display 110.

As discussed in connection with FIGS. 5-8, a speaker 125 (e.g., shown in FIG. 1A) may also generate audio based on configured display information 990. For example, audio information may be extracted from configured display information 990, converted to a format capable of being generated by speaker 125. The converted audio information may then be provided to speaker 125. Speaker 125 may generate the configured audio. For example, a speaker 125 of a GPS or a speaker 125 of an audio system of vehicle 100 may generate the configured audio. The configured audio may be provided simultaneously with or separately from an associated moving image or still image. For example, if vehicle 100 is moving, electronic display 110 may not provide the moving image, but configured audio, associated with the moving image, may be provided.

As discussed above, in connection with FIGS. 12 and 13, in an alternative implementation, electronic display 110 may be associated with vehicle 100. For example, electronic display 110 may be located in an interior or on an exterior of vehicle 100. For example, as described above, in connection with FIGS. 5-8, electronic display 110 may be an in-vehicle display (as shown in FIG. 7) or may be associated with a mobile communication device 860 (as shown in FIG. 8). In such an alternative implementation, transmitter/receiver 1220, which is associated with traffic signal 1210, may communicate with a receiver/transmitter that may be associated with electronic display 110. For example, transmitter/receiver 1220 may communicate with a receiver/transmitter that may be associated with mobile communication device 860.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 14-16, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of these embodiments. Thus, the operation and behavior of the embodiments were described without reference to the specific software code-it being understood that software, control hardware, and combinations of software and hardware may be designed to implement the embodiments based on the description herein.

Even though particular combinations of features are recited in the claims or disclosed in the specification, these combinations are not intended to limit the disclosure of the invention. In fact, many of these features may be combined in ways not specifically recited in the claims or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   creating configured display information;
   detecting if a display is moving;
   presenting, via the display, the configured display information if the display is detected to be stationary;
   identifying, if the display is detected to be moving, whether the configured display information includes moving image display information;
   presenting, via the display, the configured display information if the display is detected to be moving, and the configured display information does not include moving image display information;
   identifying, if the display is detected to be moving, the configured display information includes moving image display information, whether the moving image display information includes emergency information or traffic information;
   presenting, via the display, the configured display information, excluding the moving image display information, if the moving image display information does not include emergency information or traffic information; and
   presenting, via the display, the configured display information, including the moving image display information, if the moving image display information includes emergency information or traffic information.

2. The method of claim 1, where the display is located within an interior of a vehicle or attached to an exterior of a vehicle.

3. The method of claim 2, where the display includes at least one of:
   a display associated with a mobile communication device,
   a display associated with a Global Positioning System (GPS), or
   a display associated with a vehicle audio system.

4. The method of claim 1, where detecting if the display is moving further comprises:
   detecting successive locations of the display using a Global Positioning System (GPS) associated with the display.

5. The method of claim 1, where presenting the configured display information comprises one or more of:
   presenting textual information,
   presenting graphical information, or
   presenting video information.

6. The method of claim 5, where presenting the configured display information further comprises:
   presenting, via a speaker associated with the display, audio information related to the textual information, graphical information, or video information.

7. The method of claim 6, further comprising:
   presenting, via the speaker, audio information associated with the moving display information, when the moving display information does not include the emergency information or the traffic information, and the display is detected to be moving.

8. A method comprising:
   creating configured display information;
   detecting if a vehicle is moving relative to a display that is remotely located from the vehicle;
   presenting, via the display, the configured display information if the vehicle is detected to be stationary relative to the display;
   identifying, if the vehicle is detected to be moving relative to the display, whether the configured display information includes moving image display information;
   presenting, via the display, the configured display information if the vehicle is detected to be moving, and the configured display information does not include moving image display information;
   identifying, if the vehicle is detected to be moving, and the configured display information includes moving image display information, whether the moving image display information includes emergency information or traffic information;
   presenting, via the display, the configured display information, excluding the moving image display information, if the moving image display information does not include emergency information or traffic information; and
   presenting, via the display, the configured display information, including the moving image display information, if the moving image display information includes emergency information or traffic information.

9. The method of claim 8, where the display is associated with a billboard.

10. The method of claim 8, where detecting if the vehicle is moving relative to the display comprises:
    detecting, via a motion detector associated with the display, whether the vehicle is moving relative to the display.

11. The method of claim 8, where detecting if the vehicle is moving relative to the display comprises:
    receiving information from a traffic signal indicating a status of the traffic signal.

12. The method of claim 8, where presenting the configured display information further comprises:
    presenting, via a speaker associated with the vehicle, audio information related to the textual information, graphical information, or video information.

13. The method of claim 12, further comprising:
    presenting, via the speaker, audio information associated with the moving display information, when the moving display information does not include the emergency information or the traffic information, and the vehicle is detected to be moving.

14. A method comprising:
    creating configured display information;
    detecting if a traffic signal indicates that traffic must stop;
    presenting, via a display, the configured display information if the traffic signal indicates that the traffic must stop;
    identifying, if the traffic signal does not indicate that traffic must stop, whether the configured display information includes moving image display information;
    presenting, via the display, the configured display information if the traffic signal does not indicate that traffic must stop, and the configured display information does not include moving image display information;
    identifying, if the traffic signal does not indicate that traffic must stop, and the configured display information includes moving image display information, whether the moving image display information includes emergency information or traffic information;
    presenting, via the display, the configured display information, excluding the moving image display information, if the moving image display information does not include emergency information or traffic information; and presenting, via the display, the configured display information, including the moving image display information, if the moving image display information includes emergency information or traffic information.

15. The method of claim 14, where the display is associated with a billboard.

16. The method of claim 14, where the display is associated with a vehicle or a mobile communication device.

17. The method of claim 16, further comprising:
presenting, via a speaker, audio information associated with the moving display information, when the moving display information does not include the emergency information or the traffic information, and the traffic signal does not indicate that traffic must stop.

18. A system comprising:
a display, in communication with a receiver/transmitter that is to receive the status signal, where the display is to present received moving image display information in response to status signal;
at least one processor associated with the display; and
a memory that stores instruction that when executed by the at least one processor, cause the at least one processor to:
detect if the status signal indicates that traffic must stop,
present, via the display, the moving image display information if the status signal indicates that the traffic must stop,
identify, if the status signal does not indicates that traffic must stop, whether the received moving image display information includes emergency information or traffic information,
present, via the display, the moving image display information, if the moving image display information includes emergency information or traffic information; and
block a presentation, via the display, of the moving image display information if the moving image display information does not include the emergency information or the traffic information.

19. The system of claim 18, where, when the at least one processor presents the moving image display information, the at least one processor further is to:
present, via a speaker, audio information related to the moving image display information.

20. The system of claim 19, where when the at least one processor presents the audio information, the at least one processor further is to:
present, via the speaker, the audio information when the moving display information does not include the emergency information or the traffic information.

* * * * *